(12) United States Patent
Hanakawa et al.

(10) Patent No.: US 8,205,754 B2
(45) Date of Patent: Jun. 26, 2012

(54) FLUORORESIN POLYMER SEPARATION MEMBRANE AND PROCESS FOR PRODUCING THE SAME

(75) Inventors: Masayuki Hanakawa, Otsu (JP); Shin-ichi Minegishi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 202 days.

(21) Appl. No.: 12/374,863

(22) PCT Filed: Jul. 25, 2006

(86) PCT No.: PCT/JP2006/314651
§ 371 (c)(1), (2), (4) Date: Jan. 23, 2009

(87) PCT Pub. No.: WO2008/012872
PCT Pub. Date: Jan. 31, 2008

(65) Prior Publication Data
US 2010/0000937 A1  Jan. 7, 2010

(51) Int. Cl.
*B01D 29/00* (2006.01)
*B01D 67/00* (2006.01)
*B01D 71/10* (2006.01)
*B01D 71/16* (2006.01)
*B01D 29/14* (2006.01)

(52) U.S. Cl. ............... 210/500.3; 210/500.29; 210/490; 210/500.36; 210/500.23; 210/500.27; 264/177.14; 264/178 R

(58) Field of Classification Search ............... 210/490, 210/500.29–500.32, 500.36, 500.42, 500.23, 210/500.27; 264/41, 177.14, 178 R, 177.16
See application file for complete search history.

(56) References Cited

U.S. PATENT DOCUMENTS

| 4,302,334 A | * | 11/1981 | Jakabhazy et al. | ......... 210/500.41 |
| 4,384,047 A | * | 5/1983 | Benzinger et al. | ............... 521/64 |
| 4,399,035 A | * | 8/1983 | Nohmi et al. | ............ 210/500.23 |
| 4,810,384 A | * | 3/1989 | Fabre | .................... 210/500.23 |
| 4,968,733 A | * | 11/1990 | Muller et al. | .................... 521/64 |

(Continued)

FOREIGN PATENT DOCUMENTS
CN 1548585 11/2004
(Continued)

OTHER PUBLICATIONS

International Search Report for International Application No. PCT/JP2006/314651 mailed on Oct. 17, 2006.

(Continued)

*Primary Examiner* — Ana M Fortuna
(74) *Attorney, Agent, or Firm* — RatnerPrestia

(57) ABSTRACT

A fluorine resin polymer separation membrane and a manufacturing method of the same, which are excellent in a virus-eliminating property, further excellent in water permeability, chemical strength (chemical resistance), physical strength, and an antifouling property, and particularly suitable for practicable use as a filtration membrane for the elimination of viruses, are provided. A fluorine resin polymer separation membrane includes a layer having a three-dimensional network structure and a layer having a spherical structure, in which the layer having a three-dimensional network structure does not substantially contain micro-voids having a void diameter of 5 μm or more, and the fluorine resin polymer separation membrane has filtration performance represented by the elimination rate of 80% or more of dextran having molecular weight of 75,000. The layer having a three-dimensional network structure is formed by the solidification with a polymer solution containing a fluorine resin polymer and cellulose ester.

16 Claims, 4 Drawing Sheets

U.S. PATENT DOCUMENTS

| | | | |
|---|---|---|---|
| 5,522,991 A * | 6/1996 | Tuccelli et al. | 210/490 |
| 6,146,747 A * | 11/2000 | Wang et al. | 428/310.5 |
| 6,890,435 B2 * | 5/2005 | Ji et al. | 210/500.23 |
| 7,517,482 B2 * | 4/2009 | Huang et al. | 264/41 |
| 7,517,581 B2 * | 4/2009 | Simonetti et al. | 428/304.4 |
| 2003/0232184 A1 | 12/2003 | Morikawa | |
| 2009/0148659 A1* | 6/2009 | Ishiodori et al. | 428/131 |

FOREIGN PATENT DOCUMENTS

| | | |
|---|---|---|
| CN | 1556833 | 12/2004 |
| EP | 1520874 A1 | 4/2005 |
| JP | 56056202 | 5/1981 |
| JP | 58091732 | 5/1983 |
| JP | 58091808 | 5/1983 |
| JP | 58093734 | 6/1983 |
| JP | B-1-22003 | 4/1989 |
| JP | 02-078425 | 3/1990 |
| JP | 4310223 A | 11/1992 |
| JP | 2004182919 A | 7/2004 |
| JP | 2005-146230 | 6/2005 |
| JP | 2006-263721 | 10/2006 |
| WO | WO 03/026779 | 4/2003 |
| WO | WO 03/106545 | 12/2003 |

OTHER PUBLICATIONS

The draft of the 29th Annual Meeting of Water Environmental Association Japan, p. 267, Urase et al., Virus Removal by Microfiltration Membranes With Controlled Pore Structure, 1995 (with English translation).

Australian Search Report and Written Opinion, both dated Aug. 25, 2009, Application No. SG200900311-2.

European Search Report dated Jun. 11, 2010, application No. EP 06781563.

Japanese Office Action dated Dec. 21, 2010, application No. JP2006-049859, together with English language translation.

Chinese Office Action dated May 26, 2011, application No. 200680055430.7, together with English language translation.

* cited by examiner

FLUORORESIN POLYMER SEPARATION MEMBRANE AND PROCESS FOR PRODUCING THE SAME

This is a U.S. National Phase Application of PCT International Application Number PCT/JP2006/314651, filed Jul. 25, 2006 (which is incorporated herein by reference in its entirety).

FIELD OF INVENTION

The present invention relates to a fluorine resin polymer separation membrane suitable as a filtration membrane in water processing fields such as manufacture of drinking water, water purification treatment, or waste water treatment, and in fields of pharmaceutical manufacture, food industries, and blood cleaning membranes. In particular, the invention relates to a fluorine resin polymer separation membrane especially suitable as a filtration membrane for the elimination of microorganisms such as a virus in a liquid.

BACKGROUND OF THE INVENTION

Separation membranes are utilized as filtration membranes in recent years in various fields, e.g., fields of water processing such as manufacture of drinking water, water purification treatment, or waste water treatment, and in a field of food industries. In a field of water processing such as manufacture of drinking water, water purification treatment, or waste water treatment, filtration with separation membranes has been used for removing impurities in water in place of conventional sand filtration and flocculation-precipitation processes. In food industries also, separation membranes are used for removing yeast utilized for fermentation, or for the concentration of liquids.

Polymer separation membranes are used in these various fields, and in a water treatment field such as water purification treatment or waste water treatment, it is required to further improve water permeating performance in filtration, since a great amount of water should be filtered. Greater water permeating performance makes it possible to reduce the area of membrane to be used for filtration process, and a resulting compact filtration apparatus can reduce the facility costs, so that it is also advantageous from the costs of membrane exchange and the space for installation.

In a field of water purification treatment, separation membranes are also required to have chemical resistance, since a sterilizer such as sodium hypochlorite is added to the water in a membrane module for the purpose of preventing biofouling on the membrane surface, or membranes themselves should be washed with an acid, an alkali, chlorine or a surfactant. Further, high physical strength is required of separation membranes so as not to cause breakage during use.

Thus, separation membranes are required to have superior separation performance, chemical strength (in particular, chemical resistance), physical strength and permeability. Accordingly, separation membranes made of polyvinylidene fluoride resins having both chemical strength (in particular, chemical resistance) and physical strength have been used in various fields.

Further, in the fields of manufacture of drinking water, pharmaceutical manufacture, and food industries, various sterilizing techniques are applied to manufacturing lines and products, since if pathogenic microbes such as a virus are mixed in manufacturing processes, the manufacturing lines are contaminated, and there are dangers that the products infected with pathogenic microbes such as a virus cause mass infection of final consumers. As the sterilizing methods, heating treatment and treatment with chemicals such as chlorine are exemplified, but these treatments have little effect on viruses having heat resistance and chemical resistance. Therefore, as a means of physically eliminating viruses, membrane filtration using separation membranes has come to attract public attention. According to membrane filtration, viruses can be judged in accordance with sizes and separately removed regardless of the thermal properties and chemical properties of viruses.

As described above, it has been strongly required for separation membranes to have higher water permeating performance, and the improvements to better water permeability have been done repeatedly. For example, there is disclosed in JP-B-1-22003 (the term "JP-B" as used herein refers to an "examined Japanese patent publication") an asymmetric membrane comprising a polyvinylidene fluoride resin having a structure provided with a thin dense layer for separation on the membrane surface and micro-voids within the membrane for obtaining both excellent separation ability and water permeability. The asymmetric membrane reveals excellent water permeability by the provision of a thin dense layer and micro-voids to thereby reduce filtration resistance. The asymmetric membrane is effective in the case where striking through of a small amount of objective substance to be filtered to the side of permeated water is allowable (e.g., in the case of the removal of turbidity or simple concentration).

However, in the case of eliminating a virus, if the defect such as a pinhole or something like a crack is present on the thin dense layer, the virus strikes through the micro-voids from the defect, so that the virus cannot be eliminated completely. Accordingly, for preventing the striking through of a virus even if a pinhole or a crack occurs, it is required that the separation membrane has a dense layer not containing micro-voids, or even if the dense layer contains micro-voids, the micro-voids are sufficiently small to the thickness of the dense layer.

JP-A-58-91808 (the term "JP-A" as used herein refers to an "unexamined published Japanese patent application") and JP-A-58-93734 disclose methods of forming a membrane after adding a nonaqueous alcohol and hydrophilic inorganic fine particles to a solution containing a polyvinylidene fluoride resin, and then extracting and removing these nonaqueous alcohol and the hydrophilic inorganic fine particles to thereby obtain a separation membrane. According to these methods, separation membranes having a dense layer not containing micro-voids can be obtained. However, extraction requires special operations, and if the removal of the additives by extraction is insufficient, these additives remain in the separation membrane as foreign matters. Further, when the thickness of the membrane is reduced to increase the water permeating performance of the separation membrane, it is difficult to reveal physical strength of the suitable degree necessary as the filtration membrane for use in the manufacture of drinking water, water purification treatment, and waste water treatment.

There is disclosed in JP-A-58-91732 the manufacture of a separation membrane by using a liquid containing 20% or more of the solvent component of a polyvinylidene fluoride resin as a solidifying bath to coagulate a polyvinylidene fluoride resin discharged to thereby delay the phase separation rate at the time of solidification and obtain a separation membrane having a dense layer not containing micro-voids. However, according to the method, a void that is intended to be used to form micro-voids is dispersed in the separation membrane at large, as a result, the pore size of the separation membrane as a whole is evened off and becomes large, and the obtained separation membrane has a great surface pore size, so that this separation membrane cannot be used for virus elimination use.

Further, there is disclosed in WO 03/026779 a separation membrane for the elimination of virus comprising a coarse structure layer having a large numerical aperture and a dense structure layer having a small numerical aperture. However, the thickness is as thin as 80 μm or less, and physical strength is sacrificed for revealing practicable water permeating performance, so that it is difficult to use this separation membrane repeatedly as a separation membrane.

In these prior arts, in the case of a separation membrane having formed a dense layer having a surface pore size and a thickness of a degree capable of eliminating viruses and not containing micro-voids, there are drawbacks that when the thickness has practicably high physical strength, water permeability conspicuously lowers and, contrary to this, when water permeability is sufficiently practicable, physical strength is conspicuously deteriorated. Accordingly, it is difficult to reconcile physical strength and water permeating performance on a practicable level.

There is described in the draft of the 29$^{th}$ Annual Meeting of Water Environmental Association Japan, p. 267 (1995) that Qβ of *coli* phage having a diameter of 23 nm and a spherical structure can be got rid of by 99.99999% or more by membrane filtration treatment with a hollow fiber membrane formed of specific polyacrylonitrile (trade name: Torayfil (registered trademark), article No.: CP10-1010, manufactured by Toray Industries Inc.).

However, since the hollow fiber membrane is a separation membrane made of polyacrylonitrile, low in chemical strength and physical strength, and is deteriorated in a short period of time when membrane filtration operation accompanied by washing with chemicals is performed, so that the membrane is difficult to use practically.

Patent Literature 1: JP-B-1-22003
Patent Literature 2: JP-A-58-91808
Patent Literature 3: JP-A-58-93734
Patent Literature 4: JP-A-58-91732
Patent Literature 5: WO 03/026779
Non-patent Literature 1: The draft of 29$^{th}$ Annual Meeting of Water Environmental Association Japan, p. 267 (1995)

SUMMARY OF THE INVENTION

The invention provides a fluorine resin polymer separation membrane excellent in a virus-eliminating property, further excellent in various performances, e.g., water permeability, chemical strength (chemical resistance), physical strength, and an antifouling property, and suitable for practicable use as a filtration membrane for the elimination of viruses.

The polymer separation membrane according to an embodiment of the invention is a fluorine resin polymer separation membrane comprising a layer having a three-dimensional network structure and a layer having a spherical structure, wherein the layer having a three-dimensional network structure does not substantially contain micro-voids having a void diameter of 5 μm or more, and the fluorine resin polymer separation membrane has filtration performance represented by the elimination rate of 80% or more of dextran having molecular weight of 75,000.

Here, the layer having a three-dimensional network structure comprises a fluorine resin polymer composition containing cellulose ester, and the mixing ratio of the cellulose ester to the fluorine resin polymer is from 20 to 75 wt %. The cellulose ester is preferably cellulose acetate. It is preferred that the layer having a three-dimensional network structure is provided as the outermost layer of the polymer separation membrane of the invention, and the layer thickness of the layer having a three-dimensional network structure is preferably from 20 to 120 μm.

The average size of approximately spherical solid components present in the layer having a spherical structure is preferably from 0.1 to 5 μm, and the layer having a spherical structure preferably comprises a fluorine resin polymer and does not substantially contain cellulose ester.

In the case where the polymer separation membrane of the invention is a hollow fiber membrane, it is preferred that the hollow fiber membrane has pure water permeability at 50 kPa and 25° C. is from 0.10 to 10 m$^3$/m$^2$·hr, tenacity is 5N or more, and fracture elongation is 50% or more.

The polymer separation membrane in an embodiment of the invention is used as a filtration membrane in a membrane module.

The polymer separation membrane in one aspect of the invention can be manufactured by coating, on the surface of a layer having a spherical structure comprising a fluorine resin polymer, a polymer solution containing a fluorine resin polymer and cellulose ester in an mixing ratio of the cellulose ester to the fluorine resin polymer of from 20 to 75 wt %, and solidifying the coated solution in a solidifying bath to thereby form a layer having a three-dimensional network structure not substantially containing micro-voids of a void diameter of 5 μm or more on the surface of the spherical structure layer. Here, it is preferred for the layer having a spherical structure comprising a fluorine resin polymer not to substantially contain cellulose ester.

The polymer separation membrane in one aspect of the invention can also be manufactured by discharging a polymer solution containing cellulose ester and a fluorine resin polymer in an mixing ratio of the cellulose ester to the fluorine resin polymer of from 20 to 75 wt %, and a fluorine resin polymer solution not substantially containing cellulose ester at the same time from die, and solidifying the coated solutions in a solidifying bath to thereby form a laminated film comprising a three-dimensional network structure layer comprising the fluorine resin polymer containing cellulose ester and not substantially containing micro-voids having a void diameter of 5 μm or more, and a spherical structure layer comprising the fluorine resin polymer.

In these manufacturing methods, in the case where the polymer solution containing cellulose ester is a polymer solution in which the total polymer concentration in the solution is from 14 to 30 wt %, and the mixing ratio of the cellulose ester to the fluorine resin polymer is 20 wt % or more and less than 50 wt %, a solidifying bath containing the good solvent of the fluorine resin polymer is used as the solidifying bath. Further, in the case where the polymer solution containing cellulose ester is a polymer solution in which the total polymer concentration in the solution is from 14 to 30 wt %, and the mixing ratio of the cellulose ester to the fluorine resin polymer is from 50 to 75 wt %, the good solvent of the fluorine resin polymer may not be contained in the solidifying bath.

The fluorine resin polymer separation membrane according to an embodiment of the invention is a separation membrane comprising a layer having a spherical structure and a layer having a three-dimensional network structure not substantially containing micro-voids of a void diameter of 5 μm or more, and has the ability of virus elimination. Here, since the spherical structure layer has both chemical strength and physical strength and bears the chemical and physical strengths of the separation membrane at large, the physical strength of the separation membrane at large does not lower and provided with practicably necessary durability even when the membrane is used under the condition of membrane filtration operation accompanied by washing with chemicals.

In addition, the layer having a three-dimensional network structure does not substantially contain micro-voids having a void diameter of 5 μm or more, and has permeating performance satisfying the function of virus elimination.

Further, since the separation membrane is imparted physical strength by the spherical structure layer, the thickness of the three-dimensional network structure layer can be thinned within the range of capable of elimination of viruses, and water permeation performance can be enhanced without sacrificing the virus eliminating function.

Accordingly, the fluorine resin polymer separation membrane according to aspects of the invention is excellent in various performances such as a virus-eliminating property, water permeability, chemical strength (in particular, chemical resistance), physical strength, and an antifouling property, and can be used continuously for a long period of time as a highly reliable filtration membrane for the elimination of viruses.

DETAILED DESCRIPTION OF THE INVENTION

The fluorine resin polymer separation membrane in an embodiment of the invention is a membrane having both a three-dimensional network structure layer and a spherical structure layer, and micro-voids having a void diameter of 5 μm or more are not substantially present in the three-dimensional network structure layer.

Figure 1:
FIG. 1 is an electron microphotograph showing the cross-section of the hollow fiber membrane manufactured in Example 1.
Figure 2:
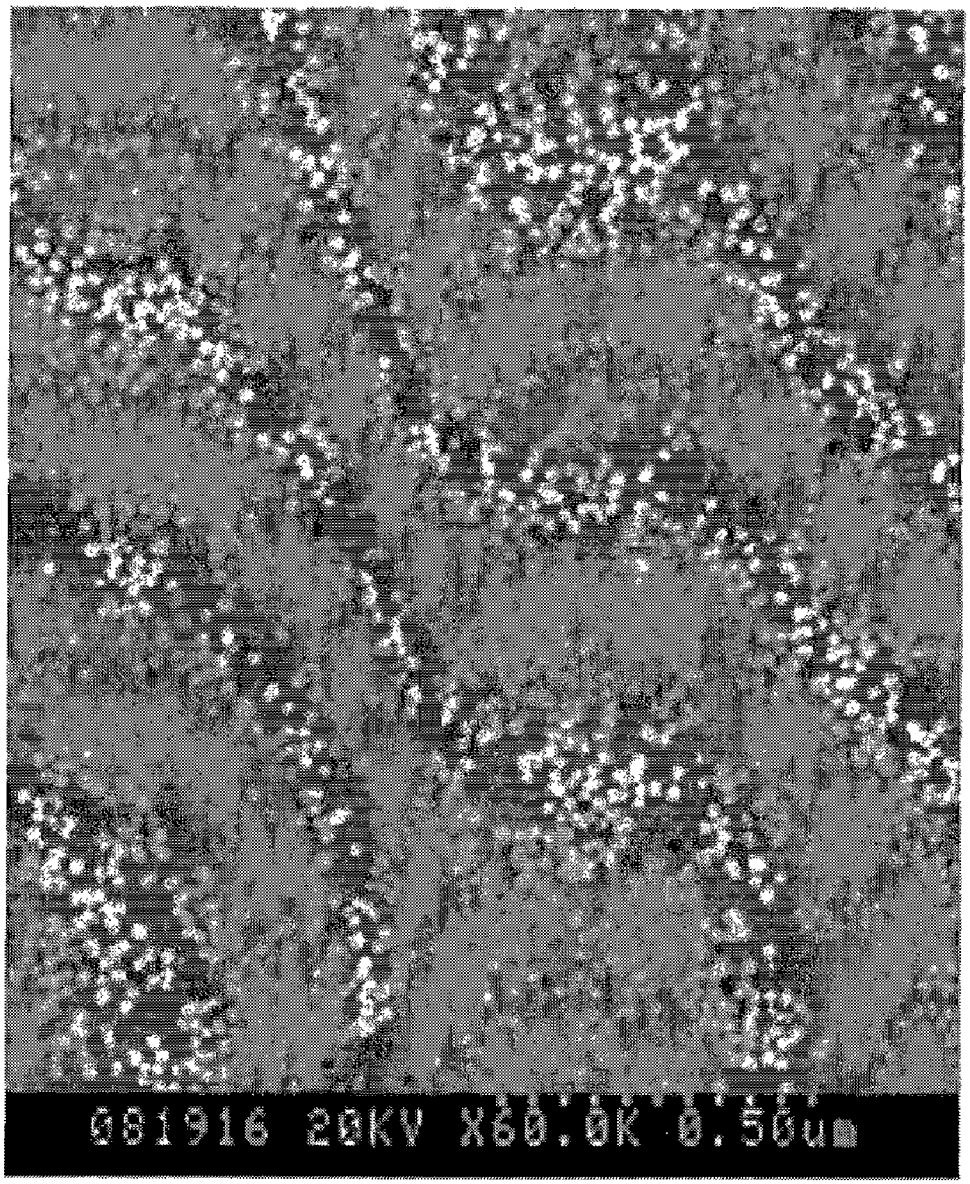
FIG. 2 is an electron microphotograph showing the outer surface of the hollow fiber membrane manufactured in Example 1.

FIGS. 1 and 2 are electron microphotographs showing an example of the separation membrane of the invention comprising the lamination of the three-dimensional network structure layer and the spherical structure layer. FIG. 1 is an electron microphotograph of the cross-section of the separation membrane (1,000 magnifications), and FIG. 2 is an electron microphotograph of the surface of the three-dimensional network structure layer (60,000 magnifications). In FIG. 1, the right upper part is the three-dimensional network structure layer and the left lower part is the spherical structure layer.

In the three-dimensional network structure layer, as shown in the surface layer part on the right upper side in FIG. 1 or in FIG. 2, there is distributed a structure in which solids of resin are spread in succession three-dimensionally in the state of network structure (this is called a three-dimensional network structure). In the three-dimensional network structure, pores and voids divided and formed by solids of resin constituting the network are scattered. These pores and voids are shown in black spots in the Figs.

On the other hand, in the spherical structure layer, there is distributed a structure in which a number of approximately spherical (also including spherical) solids of resin are linked directly or via streaks of solids (this is called a spherical structure).

Incidentally, the layer of a spherical structure means a layer wherein the above spherical structure is observed when the cross-section of a fluorine resin polymer separation membrane is photographed with a scanning electron microscope by 3,000 magnifications.

In the case of a separation membrane having a layer structure comprising the lamination of a spherical structure layer and a three-dimensional network structure layer, taking a photograph of the cross-section of the separation membrane with a scanning electron microscope by 3,000 magnifications and judging the layer having the above spherical structure as a spherical structure layer, the remaining layer can be recognized as a three-dimensional network structure layer.

In the fluorine resin polymer separation membrane in the invention, it is necessary that micro-voids having a void diameter of 5 μm or more are not substantially present in the three-dimensional network structure layer, by which highly reliable virus-eliminating performance can be achieved.

In general, a micro-void is a void having several ten times or more scale of an air space as compared with a pore and hardly shows filtration resistance to a fluid permeating a membrane. The micro-void having a void diameter of 5 μm or more specified in the invention is a void having a long axis length of 5 μm or more when the cross-section of a three-dimensional network structure layer is photographed with a scanning electron microscope by 3,000 magnifications. When it is difficult to judge the long axis length of a void by photographing, a circle having an area equivalent to the area of the void (an equivalent circle) is found with an image processor and the like, and the diameter of the equivalent circle may be taken as the long axis length of the void.

Whether micro-voids having a void diameter of 5 μm or more are substantially present or not in a three-dimensional network structure layer can be judged by photographing with a scanning electron microscope. As for the ascertainment of micro-voids having a void diameter of 5 μm or more being substantially not present in a three-dimensional network structure layer, for increasing the accuracy of ascertainment, it is preferred to take photographs of a variety of different cross-sections and judge in a wide range of a membrane. In general, when ten or more electron microphotographs (3,000 magnifications) of different parts are examined, and the number of photographs in which a micro-void having a void diameter of 5 μm or more is not present, or micro-voids having a void diameter of 5 μm or more can be seen accounts for 10% or less of the number of the microphotographs examined, preferably 5% or less, it can be judged that such micro-voids are not substantially present.

Since a fluorine resin polymer that is a base polymer constituting a three-dimensional network structure layer is high in an agglomerating property, when a membrane is manufactured by a method of solidifying a fluorine resin polymer solution in a non-solvent bath (that is, a so-called non-solvent inducing phase separation method), a membrane formed has micro-voids inside, so that manufacture of a membrane free from micro-voids is difficult. Accordingly, methods of restraining the formation of micro-voids have so far been studied. For example, there is a method of restraining the formation of micro-voids by adding the good solvent of a fluorine resin polymer to a solidifying bath to reduce the non-solvent concentration in the solidifying bath to thereby lower the penetration speed of the non-solvent, and restraining the agglomerating property of the fluorine resin polymer. However, the formation of micro-voids is restrained according to the method but, on the other hand, a void that is intended to be used to form micro-voids is dispersed in the separation membrane at large, as a result, the pore size of the separation membrane as a whole is evened off and becomes large, and a surface pore size becomes great. Accordingly, a surface pore size necessary to a separation membrane for virus elimination use cannot be obtained by merely adopting this method.

In ordinary non-solvent inducing phase separation, the composition of a polymer solution varies by aging by the penetration of a non-solvent into the polymer solution, but variation by time is too rapid, so that tracing of the variation is difficult, and analysis of the mechanism of phase separation has hardly advanced. In particular, in the case where in addition to three components of a polymer, a solvent, and a non-solvent, the fourth component and others are added, statistic analysis is almost impossible. Further, in non-solvent inducing phase separation, besides the composition of a polymer solution, various factors, such as the temperature and viscosity of a polymer solution, the composition and temperature of a solidifying bath, and the time of solidification influence the mechanism of phase separation, and the rate of contribution of each factor affecting phase separation by the composition of a polymer solution is different.

As a result of examination on whether these various factors influence the surface pore diameter of a membrane or not, it has been found that three factors of the concentration, viscosity and agglomerating property of a polymer solution are factors affecting the surface pore diameter in the case of the phase separation of a fluorine resin polymer solution. That is, it has been found that by the modification of a fluorine resin polymer solution to high concentration, high viscosity or low agglomeration, the surface pore diameter of the membrane is liable to be made small. With respect to this phenomenon, it is presumably due to the fact that these three factors cause the reduction of the void ratio and the reduction of the agglomerating rate of the polymer, and phase separation can be caused at an ultra micro part. In a fluorine resin polymer solution, for achieving high concentration, high viscosity, and a low agglomerating property, the modification by the addition of other components in sequence so as to satisfy each factor is thought. However, as described above, not only the more the number of components, the more difficult is the statistic analysis, but also the estimate of the effect of addition is difficult, since there are cases where each component accelerates or offsets their effects with each other, so that the design to obtain a separation membrane having desired performances is not easy. As another means for solving this problem, there is a method of finding a component capable of achieving high concentration, high viscosity, and a low agglomerating property at the same time, and adding the component to a fluorine resin polymer solution.

Therefore, as a result of eager examination of searching for a component capable of achieving high concentration, high viscosity, and a low agglomerating property of a fluorine resin polymer solution when added to the polymer solution, the present inventors have found that high concentration, high viscosity, and low agglomeration can be achieved by the addition of cellulose acetate. By considering the following three behavior factors synthetically, it becomes possible to control concentration, viscosity and agglomeration by the appropriate adjustment of the concentration of fluorine resin polymer and the concentration of cellulose ester in a fluorine resin polymer solution, thus the design of a separation membrane having an objective surface pore diameter has been realized.

(1) When the concentration of a cellulose ester in a fluorine resin polymer solution increases, the concentration and viscosity of the solution increase, and the agglomeration lowers.
(2) When the concentration of a fluorine resin polymer in a fluorine resin polymer solution increases, the concentration and viscosity of the solution increase, and the agglomeration increases.
(3) Cellulose ester is high in a viscosity increasing degree to the addition amount as compared with a fluorine resin polymer.

As a result of the examination based on such a concept, for obtaining a fluorine resin polymer separation membrane in aspects of the invention, it has been found to be effective for a fluorine resin polymer solution to contain a fluorine resin polymer and cellulose acetate in an mixing ratio of the cellulose ester to the fluorine resin polymer of from 20 to 75 wt %, and preferably the concentration of the polymer in the solution of from 14 to 30 wt %.

That is, the polymer concentration in the fluorine resin polymer solution is from 14 to 30 wt %, and preferably from 16 to 25 wt %. When the polymer concentration is less than 14 wt %, the physical strength of a three-dimensional network structure layer lowers, and the pore diameter on the surface of the three-dimensional network structure layer enlarges, so that there is the possibility of lowering of virus eliminating performance. On the other hand, when the polymer concentration exceeds 30 wt %, water permeability unfavorably lowers. Here, polymer concentration in a fluorine resin polymer solution is the sum total of the concentration of each polymer contained in the solution, and this can be computed from the sum of cellulose ester concentration and fluorine resin polymer concentration.

Here, the mixing ratio of the cellulose ester to the fluorine resin polymer is designed so that the viscosity and the agglomerating property of the fluorine resin polymer solution obtained reach prescribed levels. When cellulose ester is not sufficient, viscosity lowers and agglomeration increases, thus the pore diameter of the obtained three-dimensional network structure layer becomes large. Contrary to this, when cellulose ester is too much, chemical strength and physical strength of the obtained three-dimensional network structure layer lower, since the proportion of the fluorine resin polymer relatively is reduced. From these points of view, the mixing ratio of the cellulose ester to the fluorine resin polymer is from 20 to 75 wt %, preferably from 20 to 65 wt %, more preferably from 20 to 50 wt %, and still more preferably from 25 to 35 wt %. When the proportion of cellulose ester is too high or too low, it is difficult to adjust the viscosity and agglomeration property of the fluorine resin polymer solution to prescribed levels.

The mixing ratio of the cellulose ester to the fluorine resin polymer is a value computed according to the following expression.

Mixing ratio of cellulose ester to fluorine resin polymer (%)=[(concentration of cellulose ester by wt %)/(concentration of fluorine resin polymer by wt %)]×100

When the mixing ratio of the cellulose ester to the fluorine resin polymer is from 20 wt % to less than 50 wt %, a solidifying solution containing the good solvent of the fluorine resin polymer is used as the solidifying bath for the purpose of avoiding the formation of micro-voids.

On the other hand, when the mixing ratio of the cellulose ester to the fluorine resin polymer is from 50 to 75 wt %, since the formation of micro-voids can be avoided even without containing the good solvent of the fluorine resin polymer in the solidifying solution, water can be used as the solidifying bath, so that manufacturing process can be simplified. In this case, however, since the chemical strength and the physical strength of the three-dimensional network structure layer are liable to lower by the increase in cellulose ester, it is preferred to use the separation membrane under the conditions considering the chemical strength and the physical strength of the separation membrane such as taking interval of washing with chemicals long in membrane filtration operation, and setting the concentration of chemicals low. When water is used as the solidifying bath in the manufacture of a separation membrane like this case, the mixing ratio of the cellulose ester to the fluorine resin polymer is from 50 to 75 wt %, and preferably from 55 to 65 wt %.

The layer structure of the fluorine resin polymer separation membrane in embodiments of the invention is not especially restricted so long as the separation membrane consists of both a spherical structure layer and a three-dimensional network structure layer, but a layer structure comprising lamination of a spherical structure layer and a three-dimensional network structure layer is preferred. In a multistage separation membrane of laminating a plurality of layers, in the case where layers are strongly bonded at the interface, since the layers are generally getting into the other layer, the internal structure of the membrane is liable to be dense and the water permeability is intended to lower. On the other hand, when layers are not getting into the other layer at the interface, peeling resisting strength at the interface lowers, although water permeability does not decrease. Thus, peeling resisting strength and water permeability of each layer at the interface have a tendency to be contrary to each other, and it has been desired that these factors are satisfied at the same time. From this aspect, the interface lamination number of a spherical structure layer and a three-dimensional network structure layer, that is, the number of lamination is preferably smaller, and especially preferably a separation membrane comprises two layers in total of one layer of a spherical structure layer and one layer of a three-dimensional network structure layer. Further, layers other than a spherical structure layer and a three-dimensional network structure layer, e.g., a support layer such as a porous substrate, may be contained as other layer. The materials constituting a porous substrate are not especially restricted and organic materials and inorganic materials may be used, but organic fibers are preferred for their lightweight. As more preferred materials for a porous substrate, woven fabrics and nonwoven fabrics of organic fibers such as cellulose fibers, cellulose acetate fibers, polyester fibers, polypropylene fibers, and polyethylene fibers are exemplified.

The arrangement of a three-dimensional network structure layer and a spherical structure layer (in the case of a plain membrane, the arrangement of upper and lower layers, and in the case of a hollow fiber membrane, the arrangement of internal and external layers) can be changed by the system of filtration. In the separation membrane in an embodiment of the invention, since a three-dimensional network structure layer bears a separation function and a spherical structure layer bears physical strength, it is preferred to arrange that the three-dimensional network structure layer be on the side of raw water in using the separation membrane. In particular, to restrain reduction of water permeating performance due to adhesion of foul substances in the raw water, it is preferred to arrange the three-dimensional network structure layer on the outermost layer on the side of raw water. The thickness of each of the three-dimensional network structure layer and the spherical structure layer can be arbitrarily adjusted so as to satisfy the condition required of each performance of a virus eliminating property, water permeability, chemical strength (in particular, chemical resistance), physical strength and an antifouling property. When the three-dimensional network structure layer is thin, a virus eliminating property and physical strength are liable to lower, while when it is thick, water permeability tends to lower.

The fluorine resin polymer separation membrane in an aspect of the invention provides a virus eliminating property, and a virus eliminating property is substantially exhibited with the three-dimensional network structure layer. A virus eliminating property is revealed as the sum of the amount of viruses captured and eliminated in each minute film thickness of the three-dimensional network structure layer. Accordingly, for revealing a highly reliable virus eliminating property, it is also necessary to increase filtration stage, that is, the three-dimensional network structure layer has a certain degree of thickness. Therefore, for the purpose of revealing a highly reliable virus eliminating property and possessing above various performances in balance, the thickness of the three-dimensional network structure layer is generally preferably from 20 to 120 μm, and more preferably from 30 to 80 μm. The thickness of the three-dimensional network structure layer may be optimized by the water quality such as the concentration of viruses in raw water to be filtered and filtration operation method.

The fluorine resin polymer separation membrane in an embodiment of the invention does not substantially contain micro-voids of a void diameter of 5 μm or more, but micro-voids of a void diameter of less than 5 μm may be present without departing from the scope of the invention. However, when the thickness of the three-dimensional network structure layer is as thin as less than 20 μm, a virus eliminating property is liable to decrease even with micro-voids of a void diameter of less than 5 μm being present. In particular, in the case where micro-voids are distributed gathering together in the thickness direction of the three-dimensional network structure layer, the real thickness of the three-dimensional network structure layer is reduced at that place, so that a virus eliminating property is liable to conspicuously decrease. Accordingly, even with micro-voids of a void diameter of less than 5 μm, the less the better, and most preferably the three-dimensional network structure layer is free from micro-voids.

The three-dimensional network structure layer is formed by the penetration of the non-solvent in a solidifying bath into a polymer solution to thereby fix the structure. The penetration of the non-solvent at this time starts from the surface side of the three-dimensional network structure layer, so that the fixation of the structure on the surface side advances at a faster speed than in the internal side. When the thickness of the three-dimensional network structure layer is as thick as exceeding 120 μm, the difference in time required in fixation of the surface side and the internal side is great, so that micro-voids are easy to be formed within the membrane and the object of the invention is difficult to be achieved. From this point, the thickness of the three-dimensional network structure layer is preferably 120 μm or less.

The thickness of the spherical structure layer can be arbitrarily adjusted so as to satisfy the condition required of each performance of a virus eliminating property, water permeability, chemical strength (in particular, chemical resistance), physical strength and an antifouling property. The thinner the spherical structure layer, the lower is the physical strength, and the thicker the spherical structure layer, the lower is the water permeability. Accordingly, considering the balance of these various performances, the thickness of the spherical structure layer is preferably from 100 to 500 μm, and more preferably from 200 to 300 μm.

Further, the ratio of the three-dimensional network structure layer and the spherical structure layer is also important for these performances and filtration membrane operation costs. As the proportion of the three-dimensional network structure layer increases, physical strength is reduced. Therefore, the ratio of the average thickness of the three-dimensional network structure layer (A) to the average thickness of the spherical structure layer (B), (A/B) is preferably from 0.04 to 0.5, and more preferably from 0.1 to 0.4.

In an embodiment of the polymer separation membrane in the invention, since the three-dimensional network structure layer contains cellulose acetate, it is preferred to make the interface of the spherical structure layer and the three-dimensional network structure layer the structure of getting into the other layer in view of the enhancement of peeling resistance.

When the average diameter of the approximately spherical solids present in the spherical structure layer becomes large, the void ratio becomes high and water permeability rises, but physical strength lowers. On the other hand, when the average diameter becomes small, the void ratio becomes low and physical strength increases, but water permeability lowers. Therefore, the average diameter of the approximately spherical solids present in the spherical structure layer is preferably from 0.1 to 5 μm, and more preferably from 0.5 to 4 μm. The average diameter can be found by taking photographs of the cross-section of a fluorine resin polymer separation membrane with a scanning electron microscope by 10,000 magnifications, measuring the diameters of arbitrarily selected 10 or more approximately spherical solids, preferably 20 or more, and averaging the measured diameters in number. As the average diameter of the approximately spherical solids, a circle having an area equivalent to the area of an approximately spherical solid (an equivalent circle) is found with an image processor and the like, and the diameter of the equivalent circle may be used.

In the case of a separation membrane where a three-dimensional network structure layer is arranged as the outermost layer on the side of the object to be separated, pores are seen by observing the outermost layer from just above with a microscope. Since the three-dimensional network structure layer bears separation function, the average size and the maximum size of the pores on the surface of the three-dimensional network structure layer are controlled according to the use of the separation membrane. For the eliminating function of virus of the fluorine resin polymer separation membrane in aspects of the invention, the average pore size on the surface of the three-dimensional network structure layer is preferably from 1 to 20 nm, and more preferably from 5 to 10 nm. Further, the maximum pore size on the surface, although it differs according to the sizes of viruses to be eliminated, is preferably 100 nm or less, more preferably 70 nm or less, and still more preferably 50 nm or less. When pore sizes are too large, e.g., when the average surface pore size exceeds 20 nm, or the maximum surface pore size exceeds 100 nm, the eliminating function of virus is liable to lower, and the eliminating function of virus is difficult to be obtained within the preferred thickness range of the three-dimensional network structure layer.

Whether an obtained fluorine resin polymer separation membrane reveals the prescribed eliminating function of virus or not may be judged by the evaluation of eliminating function by actually using viruses. For example, it is sufficient to evaluate the eliminating rate of a separation membrane with raw water containing Qβ of *coli* phage having a diameter of 23 nm and a regular icosahedral structure. However, handling of viruses is restricted for reasons of sanitation and the handling process is complicated. Further, viruses continue living activity during incubation and preservation, and even during evaluation. Thus, viruses show aging change peculiar to living things, so that the quantitative evaluation of the eliminating performance by directly using viruses is not easy.

Accordingly, in embodiments of the fluorine resin polymer separation membrane of the invention, on the basis of the concept of fractional molecular weight that is generally used as an indicating method of the pore diameter of an ultrafiltration membrane, the eliminating rate of dextran having molecular weight of 75,000 is adopted as a means of simply evaluating the eliminating performance of a virus.

According to "Terminology for Membranes and Membrane Processes, IUPAC Recommendations (1996)", fractional molecular weight is the molecular weight of a solute capable of reaching 90% of the eliminating rate of a membrane. Fractional molecular weight is determined as follows. In the first place, every kind of dilute solutions containing a plurality of kinds of water-soluble polymers (dextran and the like) having different molecular weights as respective solutes is filtered through a membrane, and the eliminating rate of every kind of water-soluble polymers is found. In the next place, an approximate curve is drawn plotting the molecular weight of the water-soluble polymers as the abscissa and the eliminating rate as the ordinate, and the molecular weight of the point of intersection with the eliminating rate of 90% is taken as fractional molecular weight.

By using the concept of the fractional molecular weight described above, the eliminating performance of a virus can be approximately expressed with the eliminating rate of dextran having molecular weight of 75,000. That is, the eliminating rate in membrane filtering a dilute solution containing dextran having Stokes' diameter smaller than Qβ of *coli* phage and molecular weight of 75,000 (Stokes' diameter: about 6 nm) as the solute is taken as the criterion of evaluation of a virus elimination performance. The reason for this is that the elimination rate of dextran having molecular weight of 75,000 of the separation membrane described in patent literature 1 above (trade name: Torayfil (registered trademark), article No.: CP10-1010, manufactured by Toray Industries Inc., hereinafter abbreviated to CP10-1010) is 80 wt %, and 80 wt % of the elimination rate of dextran having molecular weight of 75,000 can be considered to be corresponding to the elimination level of 99.99999% or more of Qβ of *coli* phage.

Notwithstanding that the above CP10-1010 membrane is a separation membrane capable of elimination of Qβ of *coli* phage by 99.99999% or more, that is, the degree that Qβ of *coli* phage cannot be detected in the filtered water at all, elimination rate of dextran having molecular weight of 75,000 is 80%. The reason for this is that the pores of CP10-010 membrane are extremely small as compared with the size of Qβ of *coli* phage, and the distribution of pore diameters is in the range that Qβ of *coli* phage cannot substantially pass, but when compared with the size of dextran having molecular weight of 75,000 of the small diameter of about 6 nm, the pore size is a size of the degree allowing passing of 20%. From this point of view, when a certain polymer separation membrane is capable of eliminating 80% or more dextran having molecular weight of 75,000, it can be considered that the polymer separation membrane has pores equivalent to or smaller than the pores of CP10-1010 membrane, and the distribution of pore diameters is also equivalent to CP10-1010 membrane or on lower pore size side, and such a polymer separation membrane has the same or higher eliminating rate of Qβ of *coli* phage. Accordingly, for a fluorine resin polymer separation membrane to highly reliably eliminate viruses represented by *coli* phage Qβ, it is necessary that the elimination rate of dextran having molecular weight of 75,000 should be 80% or more, and more preferably 85% or more.

The average diameter of the pores on the surface of a three-dimensional network structure layer is found by taking the photographs of the surface of the three-dimensional network structure layer with a scanning electron microscope by 60,000 magnifications, measuring the diameters of arbitrarily selected 10 or more pores, preferably 20 or more, and averaging the measured diameters in number. When a pore diameter is not circular, a circle having an area equivalent to the area of the pore (an equivalent circle) is found with an image processor and the like, and the diameter of the equivalent circle may be taken as the diameter of the pore.

Embodiments of the fluorine resin polymer separation membrane in the invention may be any form of a hollow fiber membrane and a plain fiber membrane. In the case of a hollow fiber membrane form, it is possible to fill a separation membrane efficiently in a membrane module and has the advantage of capable of increasing an effective area of membrane per a unit volume, so that a hollow fiber membrane form is practicably preferred.

It is preferred for the fluorine resin polymer separation membrane in the invention to satisfy the practicably required permeating performance and durability. For example, as permeating performance, pure water permeating performance at 50 kPa, 25° C. is preferably from 0.10 to $m^3/m^2 \cdot hr$, and more preferably from 0.2 to 7 $m^3/m^2 \cdot hr$. When pure water permeability is less than 0.10 $m^3/m^2 \cdot hr$, permeability is too low and is not practicable as the fluorine resin polymer separation membrane. While when pure water permeability exceeds 10 $m^3/m^2 \cdot hr$, the pore diameter of the fluorine resin polymer separation membrane is too large, so that preventing performance of impurities is low and not preferred.

The tenacity of a membrane is preferably 5N or more, and more preferably 6N or more. The fracture elongation of a membrane is preferably 50% or more, and more preferably 70% or more. When the tenacity is less than 5N or the fracture elongation is less than 50%, handleability in handling a fluorine resin polymer separation membrane is deteriorated and, at the same time, breakage of the membrane in filtration, fiber breakage and pressure breakage are liable to occur, and so not preferred. In general, when breaking strength and fracture elongation become high, permeability lowers, accordingly the breaking strength and fracture elongation of a fluorine resin polymer separation membrane are sufficient in the range of capable of achieving the above handleability and the physical durability in filtration, so that these factors may be decided considering the balance of permeability and operation costs and the like.

By satisfying these conditions of pure water permeating performance, tenacity and fracture elongation, the fluorine resin polymer separation membrane of the invention possesses strength and water permeability applicable to use in fields of membranes for water processing, pharmaceutical manufacture, food industries, and blood cleaning, and virus eliminating function can be achieved by membrane filtration in these uses.

The pure water permeability of a hollow fiber separation membrane can be measured by manufacturing a miniature membrane module comprising four hollow fiber membranes having a length of 200 mm, and through a filtration test. In the case of a separation membrane of a plain membrane, pure water permeability is measured by cutting a separation membrane in a disc form having a diameter of 43 mm and setting it on a cylindrical filter holder (stirring type Ultra Holder UHP-43K, manufactured by Advantech Co., Ltd.) of a filtering apparatus, and through a filtration test.

A permeated water amount $(m^3)$ is found by performing dead-end filtration by external pressure of membrane filtration for 10 minutes with the miniature membrane module or the filtering apparatus at 25° C. and differential pressure of filtration of 16 kPa. The permeated water amount $(m^3)$ is converted to a value per a unit time (hr) and an effective area of membrane $(m^2)$, and multiplied by (50/16) times to obtain a permeated amount value $(m^3/m^2 \cdot hr)$ under pressure of 50 kPa, as the value of pure water permeability. The value of pure water permeability of a separation membrane can also be found by converting a value obtained by pressure and suction with a pump.

Further, the elimination rate of dextran having molecular weight of 75,000 is found with the miniature membrane module or the filtering apparatus according to the following method. In the first place, membrane filtration is performed for 10 minutes by an external pressure cross flow system, under the conditions of temperature of 25° C., differential pressure of filtration of 16 kPa, and membrane linear velocity of 1 m/s, with an aqueous solution containing 1,000 ppm of dextran having molecular weight of 75,000 as the raw water. In the next place, the dextran concentration in the raw water and the dextran concentration in the filtered water are measured with a differential refractive index meter (RID-6A, 100 V, manufactured by Shimadzu Corporation), and the elimination rate (%) of dextran having molecular weight of 75,000 is computed according the following expression.

Elimination rate of dextran having molecular weight of 75,000 (%)=[1−(dextran concentration in filtered water)/(dextran concentration in raw water)]×100

The measuring methods of the tenacity and fracture elongation of a separation membrane are not especially restricted, and the tenacity and fracture elongation at the time of breaking are measured, for example, with a tension tester and a sample of measuring length of 50 mm, and by the method of performing tensile testing at a tensile rate of 50 mm/min. This measuring operation is performed 5 times or more with a different sample, and the obtained values are number averaged to obtain the average values of the tenacity and fracture elongation.

In embodiments of the polymer separation membrane in the invention, the spherical structure layer comprises substantially a fluorine resin polymer alone, and the three-dimensional network structure layer comprises a fluorine resin polymer and cellulose ester.

In embodiments of the invention, the reason that cellulose ester is blended as the polymer constituting the three-dimensional network structure layer is, as described above, to impart high concentration, high viscosity and a low agglomerating property at the same time to a fluorine resin polymer solution in forming the three-dimensional network structure layer. Accordingly, compounds are not especially restricted so long as they satisfy the object. That is, even when high concentration, high viscosity and a low agglomerating property can be imparted to a fluorine resin polymer solution by the addition of a plurality of compounds, a fluorine resin polymer separation membrane having a suitable function for virus elimination can be obtained.

The fluorine resin polymers for use in embodiments of the invention are vinylidene fluoride homopolymers and/or vinylidene fluoride copolymers, and a plurality of these polymers may be contained. As vinylidene fluoride copolymers, copolymers of vinylidene fluoride and at least one polymer selected from vinyl fluoride, ethylene tetrafluoride, propylene hexafluoride, and ethylene chloride trifluoride are exemplified. The weight average molecular weight of the fluorine resin polymers may be arbitrarily selected according to the required tenacity and water permeability of the fluorine resin polymer separation membrane. As the weight average molecular weight increases, the water permeability lowers, while as the weight average molecular weight decreases, the tenacity is liable to lower. Therefore, the weight average molecular weight of the fluorine resin polymers is preferably from 50,000 to 1,000,000. In the case of the fluorine resin polymer separation membrane for use in water processing use subjected to chemical washing, the weight average molecular weight of the fluorine resin polymers is preferably from 100,000 to 700,000, and more preferably from 150,000 to 600,000.

Other components, e.g., organic substances, inorganic substances and polymers may be contained in the spherical structure layer and the three-dimensional network structure layer in the polymer separation membrane of the invention within the range of not hindering the object of the invention.

The cellulose esters for use in the invention are not especially restricted so long as they have cellulose esters on the main chain and/or side chain as the molecular units, and molecular units other than cellulose esters may be present. As the monomers constituting the molecular units other than cellulose esters, e.g., alkene such as ethylene and propylene, alkyne such as acetylene, vinyl halide, vinylidene halide, methyl methacrylate and methyl acrylate are exemplified. In particular, ethylene, methyl methacrylate and methyl acrylate are preferred for the reasons that they are inexpensively available and easily introducible to the main chain and/or side chain. As the introducing methods, known polymerization techniques such as radical polymerization, anionic polymerization and cationic polymerization can be used.

As the cellulose esters, homopolymers comprising substantially cellulose ester alone as the molecular unit are known. As such homopolymers, cellulose acetate, cellulose acetate propionate, and cellulose acetate butyrate are exemplified, and these homopolymers are preferably used for the reasons that they are inexpensively available and easily handling.

Since these cellulose esters are used for forming a three-dimensional network structure layer together with a fluorine resin polymer, it is preferred for them to be miscible with fluorine resin polymers on appropriate conditions. Further, when cellulose ester and fluorine resin polymer are miscible and soluble in the good solvent of fluorine resin polymer, a polymer solution can be handled with ease, so that especially preferred.

Since cellulose esters contained in a three-dimensional network structure layer are hydrophilic polymers, the hydrophilicity of a fluorine resin polymer separation membrane increases, and water permeability and antifouling property can also be improved. Further, the water permeability and antifouling property of a fluorine resin polymer separation membrane may further be enhanced by hydrolyzing a part of ester of the cellulose ester in a three-dimensional network structure layer to thereby form a hydroxyl group of more hydrophilic.

The fluorine resin polymer separation membrane in the invention having both a three-dimensional network structure layer and a spherical structure layer can be manufactured according to various methods. For example, a method of coating a solution of a fluorine resin polymer containing cellulose ester on the surface of a spherical structure layer, and then solidifying the coated layer in a solidifying bath containing the good solvent of the fluorine resin polymer to thereby form a three-dimensional network structure layer on the spherical structure layer, and a method of discharging a fluorine resin polymer solution containing cellulose ester for forming a three-dimensional network structure layer and a fluorine resin polymer solution for forming a spherical structure layer at the same time from die, and then solidifying and cooling solidifying both layers in a solidifying bath containing the good solvent of the fluorine resin polymer to thereby form a three-dimensional network structure layer and a spherical structure layer simultaneously are exemplified.

Here, in the solution of a fluorine resin polymer containing cellulose ester, when the mixing ratio of the cellulose ester to the fluorine resin polymer is as high as 50 wt % or more, it is not necessary to contain the good solvent component of the fluorine resin polymer in the solidifying bath for solidifying and cooling solidifying the fluorine resin polymer solution containing cellulose ester, so that the fluorine resin polymer separation membrane of the invention can be manufactured by the solidification in a solidifying bath not containing the good solvent component.

That is, it is preferred to manufacture the fluorine resin polymer separation membrane of the invention in a manner that, in manufacturing a fluorine resin polymer separation membrane having a three-dimensional network structure layer and a spherical structure layer, a polymer solution containing a fluorine resin polymer and cellulose ester, in which the total polymer concentration is from 14 to 30 wt %, and the mixing ratio of the cellulose ester to the fluorine resin polymer is 20 wt % or more and less than 50 wt %, is coagulated in a solidifying bath containing the good solvent component of the fluorine resin polymer to form a three-dimensional network structure layer.

Further, when the mixing ratio of the cellulose ester to the fluorine resin polymer is from 50 to 75 wt %, it is not necessary to contain the good solvent component of the fluorine resin polymer in the solidifying bath for solidifying the polymer solution. Accordingly, it is also possible that the polymer solution containing a fluorine resin polymer and cellulose ester, in which the total polymer concentration is from 14 to 30 wt %, and the mixing ratio of the cellulose ester to the fluorine resin polymer is from 50 to 75 wt %, is coagulated in a solidifying bath to form a three-dimensional network structure layer.

In the first place, the method of coating a solution of a fluorine resin polymer containing cellulose ester on the surface of a spherical structure layer, and then solidifying the coated layer in a solidifying bath containing the good solvent component of the fluorine resin polymer to thereby form a three-dimensional network structure layer on the spherical structure layer is explained.

In the case of this manufacturing method, a spherical structure layer is formed first. A fluorine resin polymer solution is prepared by dissolving a fluorine resin polymer in relatively high concentration of from 20 to 60 wt % in the bad solvent or good solvent of the fluorine resin polymer at relatively high temperature, and the prepared polymer solution is discharged from a nozzle to form a hollow fiber membrane state or a plain fiber membrane state, and the discharged polymer solution is cooling solidified in a cooling bath, thus a spherical structure layer is formed. The spherical structure layer substantially comprises a fluorine resin polymer alone like this, so that it possesses both chemical strength and physical strength.

Here, the bad solvent means a solvent that is not capable of dissolving the fluorine resin polymer by 5 wt % or more at low temperature of 60° C. or lower, but is capable of dissolving by 5 wt % or more in a high temperature region of 60° C. or higher and the melting point of the polymer or lower (for example, when the polymer consists of vinylidene fluoride homopolymer alone, the melting point is 178° C. or so).

Contrary to this, a solvent capable of dissolving the fluorine resin polymer by 5 wt % or more even in a low temperature region of 60° C. or lower is a good solvent, and a solvent that is not capable of dissolving or swelling the fluorine resin polymer even by raising the temperature to the melting point of the fluorine resin polymer or the boiling point of the solvent is defined as a non-solvent.

As the bad solvents of fluorine resin polymers, middle chain alkyl ketone, ester, glycol ester, and organic carbonate, etc., such as cyclohexanone, isophorone, γ-butyrolactone, methyl isoamyl ketone, dimethyl phthalate, propylene glycol methyl ether, propylene carbonate, diacetone alcohol, glycerol triacetate, etc., and mixtures of these solvents are exemplified. Even mixed solvents of a non-solvent and a bad solvent, those that satisfy the above definition of the bad solvent are regarded as bad solvents. As the good solvents, the examples include lower alkyl ketone, ester, amide, etc., such as N-methyl-2-pyrrolidone, dimethyl sulfoxide, dimethylacetamide, dimethylformamide, methyl ethyl ketone, acetone, tetrahydrofuran, tetramethylurea, trimethyl phosphate, etc., and mixed solvents of these solvents.

Further, as the non-solvents, aliphatic hydrocarbon, aromatic hydrocarbon, aliphatic polyhydric alcohol, aromatic polyhydric alcohol, chlorinated hydrocarbon, and other chlorinated organic liquids, such as water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, low molecular weight polyethylene glycol, etc., and mixed solvents of these solvents are exemplified.

In the above manufacturing method, it is preferred to prepare the fluorine resin polymer solution by dissolving the fluorine resin polymer in relatively high concentration of from 20 to 60 wt % in the bad or good solvent of the fluorine resin polymer at relatively high temperature of 80 to 170° C. The higher the polymer concentration in the fluorine resin polymer solution, the higher is the elongation of the fluorine resin polymer separation membrane to be obtained. However, when the concentration is too high, the void ratio of the fluorine resin polymer separation membrane becomes small and the permeating performances lowers. From the viewpoints of the easiness of handling of the fluorine resin polymer solution and a film forming property, it is preferred that the solution viscosity is in a proper range. Accordingly, the polymer concentration in the fluorine resin polymer solution is preferably from 30 to 50 wt %.

For cooling solidifying the fluorine resin polymer solution in a predetermined form such as hollow fiber or a plain membrane, a method of discharging the fluorine resin polymer solution from a nozzle into a cooling bath is preferred. At this time, as the cooling liquid for use in the cooling bath, it is preferred to use a liquid of a temperature of from 5 to 50° C. and containing a bad solvent or good solvent in concentration of from 60 to 100 wt %. The cooling liquid may contain a non-solvent besides the bad solvent or good solvent within the range not hindering the formation of a spherical structure. Incidentally, when a liquid comprising a non-solvent as the main component is used as the cooling liquid, phase separation by the penetration of the non-solvent occurs preferentially to phase separation by cooling solidification, so that a spherical structure is difficult to obtain. Further, in the case of manufacturing a fluorine resin polymer separation membrane by the method of rapidly quenching and cooling solidifying a solution obtained by dissolving a fluorine resin polymer of relatively high concentration in the bad solvent or good solvent of the fluorine resin polymer at a relatively high temperature, there are cases where the structure of the separation membrane is not a spherical structure but a dense network structure according conditions. Accordingly, for forming a spherical structure, the combinations of the concentration and the temperature of a fluorine resin polymer solution, the composition of a solvent used, and the composition and temperature of a cooling liquid to be used should be appropriately controlled.

In the case where the fluorine resin polymer separation membrane is made to a hollow fiber membrane, the prepared fluorine resin polymer solution is discharged from the outer tube of a double tube type nozzle and at the same time a fluid for forming a hollow part is discharged from the inner tube of the double tube type nozzle, and the discharged polymer solution is cooling solidified in the cooling bath to thereby form a hollow fiber membrane. At this time, as the fluid to form the hollow part, gases or liquids can be generally used, but in the invention it is preferred to use a liquid containing a bad solvent or good solvent in concentration of from 60 to 100 wt % as in the cooling liquid. The fluid to form the hollow part may be supplied while cooling, but when the hollow membrane can be sufficiently solidified with the cooling force of the cooling bath alone, the fluid to form the hollow part may be supplied without cooling.

Further, in the case where the fluorine resin polymer separation membrane is made to a plain membrane, the prepared fluorine resin polymer solution is discharged from a slit nozzle, and solidified in a cooling bath.

On the surface of the thus-prepared spherical structure layer is formed (laminated) a three-dimensional network structure layer with a fluorine resin polymer solution containing cellulose ester. The lamination method is not especially restricted, but the following method is preferably used, that is, a method of coating a fluorine resin polymer solution containing cellulose ester on the surface of the spherical structure layer, and solidifying the fluorine resin polymer solution coated on the surface of the spherical structure layer by immersing in a solidifying bath containing the good solvent of the fluorine resin polymer to thereby form (laminate) a three-dimensional network structure layer.

In the fluorine resin polymer solution containing cellulose ester, when the mixing ratio of the cellulose ester to the fluorine resin polymer is as high as 50 wt % or more, it is also possible to solidify the fluorine resin polymer solution containing cellulose ester by the immersion in a solidifying bath not containing the good solvent component of the fluorine resin polymer to thereby form (laminate) a three-dimensional network structure layer.

At this time, the fluorine resin polymer solution containing cellulose ester is a polymer solution containing cellulose ester and a fluorine resin polymer, and the sum total of the concentration of cellulose ester and the concentration of fluorine resin polymer to the polymer solution is adjusted to 14 to 30 wt %, and preferably from 16 to 25 wt %, and the mixing ratio of the cellulose ester to the fluorine resin polymer is from 20 to 75 wt %, preferably from 20 to 65 wt %, more preferably from 25 to 65 wt %, and especially preferably from 25 to 35 wt %. In the fluorine resin polymer solution containing cellulose ester, when the mixing ratio of the cellulose ester to the fluorine resin polymer is less than 50 wt %, it is necessary to contain the good solvent of the fluorine resin polymer in the solidifying bath, but when the mixing ratio is from 50 to 70 wt %, preferably from 55 to 65 wt %, the fluorine resin polymer separation membrane of the invention can also be manufactured by solidifying the fluorine resin polymer solution containing cellulose ester in a solidifying bath not containing the good solvent component of the fluorine resin polymer.

Here, the fluorine resin polymer solution containing cellulose ester for forming a three-dimensional network structure layer comprises cellulose ester, a fluorine resin polymer and a solvent, and the good solvent of the fluorine resin polymer is preferably used as the solvent. As the good solvent of the fluorine resin polymer, the above-described good solvents can be used.

Further, the optimal dissolution temperature of the fluorine resin polymer solution containing cellulose ester differs depending upon the kinds and concentrations of fluorine resin polymers and cellulose esters, the kinds of solvents, and the kinds and concentrations of the later-described additives. For the purpose of well reproducibly preparing a stable solution, it is preferred to perform preparation by stirring at a temperature not higher than the boiling point of the solvent for a couple of hours to obtain a transparent solution. The temperature in coating the polymer solution is also important to manufacture a separation membrane having excellent characteristics. For example, for stably forming a fluorine resin polymer separation membrane, it is preferred to control the temperature so as not to hinder the stability of the polymer solution, and to prevent the invasion of non-solvents from the outside of the reaction system. Further, when the temperature of the polymer solution in coating is too high, the fluorine resin polymer on the surface area of the spherical structure layer is liable to be dissolved to form a dense layer at the interface between the three-dimensional network structure layer and the spherical structure layer, so that the water permeability of the obtained separation membrane lowers. Contrary to this, when the temperature of the polymer solution in coating is too low, the polymer solution partially gels during coating, so that a separation membrane full of defects is formed and separation performance lowers. It is therefore necessary to optimize the solution temperature in coating by the composition of the polymer solution and the objecting performance of the separation membrane.

When a hollow fiber type a fluorine resin polymer separation membrane is manufactured, a fluorine resin polymer solution containing cellulose ester is coated on the outer surface of a spherical structure layer of hollow fiber membrane (spherical structural hollow fiber membrane) according to the above method. For example, it is preferred to immerse the spherical structural hollow fiber membrane in the fluorine resin polymer solution containing cellulose ester, or to drop the fluorine resin polymer solution containing cellulose ester on the outer surface of the spherical structural hollow fiber membrane. In the case where the fluorine resin polymer solution containing cellulose ester is coated on the inner surface of the spherical structural hollow fiber membrane, a method of injecting the polymer solution to the inside of the hollow fiber membrane is used. At this time, for controlling the coating amount of the fluorine resin polymer solution containing cellulose ester, a method of controlling the amount of the polymer solution itself to be supplied to coating, or a method of immersing the spherical structure membrane in the polymer solution, or coating the polymer solution on the spherical structure membrane, and then scraping off a part of the adhered polymer solution, or blowing off with an air knife, to thereby adjust the coating amount can be used.

Further, when a solidifying bath containing the good solvent component of the fluorine resin polymer is used as the solidifying bath for immersion after coating, it is preferred that the amount of the good solvent component of the fluorine resin polymer is from 10 to 60 wt %, preferably from 20 to 50 wt %. By the adjustment of the good solvent component contained in the solidifying bath to the above range, the penetration rate of a non-solvent to the coated fluorine resin polymer solution containing cellulose ester decreases, whereby a three-dimensional network structure layer not substantially containing micro-voids having a void diameter of 5 µm or more can be formed. It is difficult to control the invasion rate of a non-solvent with the content of the good solvent component of less than 10 wt %, so that the formation of micro-voids can be controlled with difficulty. When the content of the good solvent component exceeds 60 wt %, the solidification rate lowers conspicuously and solidification takes a lot of time. As the good solvent components of the fluorine resin polymer, those exemplified above can be used.

For controlling the average pore size on the surface of the obtained polymer separation membrane to a desired size capable of revealing the virus eliminating function, e.g., the following method can be adopted, although it differs depending upon the kinds and concentrations of cellulose esters used in the formation of a three-dimensional network structure layer.

An additive for controlling the pore size is blended in a fluorine resin polymer solution containing cellulose ester, and dissolved out in forming a three-dimensional network structure layer or after forming a three-dimensional network structure layer, whereby the average pore size on the surface can be controlled. As the pore size controlling additives, the following organic compounds and inorganic compounds are exemplified. As the organic compounds, those soluble both in the solvents for use in the polymer solution and in the non-solvents that cause non-solvent-induced phase separation are preferably used. The examples include water-soluble polymers, e.g., polyvinylpyrrolidone, polyethylene glycol, polyethylenimine, polyacrylic acid, and dextran, surfactants, glycerol, and saccharide. As the inorganic compounds, those soluble both in the solvents for use in the polymer solution and in the non-solvents that cause non-solvent-induced phase separation are preferably used, and the examples include calcium chloride, magnesium chloride, lithium chloride, and barium sulfate.

Further, the phase separation rate can be controlled by the addition of a non-solvent to the fluorine resin polymer solution containing cellulose ester.

In addition, as another manufacturing method of the fluorine resin polymer separation membrane of the invention having a three-dimensional network structure layer and a spherical structure layer, a method of discharging a fluorine resin polymer solution for forming a three-dimensional network structure layer and a fluorine resin polymer solution for forming a spherical structure layer at the same time from die, and then solidifying and cooling solidifying both layers in a solidifying bath containing the good solvent of the fluorine resin polymer to thereby form a three-dimensional network structure layer and a spherical structure layer simultaneously is described below. According to the method, a three-dimensional network structure layer and a spherical structure layer can be formed simultaneously, so that the manufacturing process can be simplified.

Here, the fluorine resin polymer solution for forming a three-dimensional network structure layer is a fluorine resin polymer solution containing cellulose ester, and the sum total of the concentration of cellulose ester and the concentration of fluorine resin polymer to the polymer solution containing cellulose ester is adjusted to 14 to 30 wt %, and preferably from 16 to 25 wt %, and the mixing ratio of the cellulose ester to the fluorine resin polymer is from 20 to less than 50 wt %, and preferably from 25 to 35 wt %. In the fluorine resin polymer solution containing cellulose ester, the mixing ratio of the cellulose ester to the fluorine resin polymer may be from 50 to 75 wt %, and preferably from 55 to 65 wt %.

Further, as the fluorine resin polymer solution for forming a spherical structure layer, a fluorine resin polymer solution prepared by dissolving a fluorine resin polymer in relatively high concentration of from 20 to 60 wt % in the bad solvent or good solvent of the fluorine resin polymer at relatively high temperature (from 80 to 170° C.) is used.

Here, as the fluorine resin polymer, cellulose ester, solidifying bath, bad solvent and good solvent, those exemplified above may be used.

Further, the temperature of the solidifying bath containing the good solvent of the fluorine resin polymer is from 5 to 50° C., and it is preferred to contain the good solvent of the fluorine resin polymer in the concentration of from 10 to 60 wt %, preferably from 20 to 50 wt %. By the adjustment of the amount of the good solvent in the solidifying bath to the above range, the invasion rate of non-solvents to the fluorine resin polymer solution for forming a three-dimensional network structure layer lowers, and a three-dimensional network structure layer not substantially containing micro-voids having a void diameter of 5 μm or more can be formed. It is difficult to control the invasion rate of a non-solvent with the content of the good solvent component of less than 10 wt %, so that the formation of micro-voids can be controlled with difficulty. When the content of the good solvent component exceeds 60 wt %, the solidification rate lowers conspicuously and solidification takes a lot of time. By adjusting the temperature of the solidifying bath to the above range, the fluorine resin polymer solution for forming a spherical structure layer can be quenched and cooling solidified.

The nozzles for use for discharging a fluorine resin polymer solution for forming a three-dimensional network structure layer and a fluorine resin polymer solution for forming a spherical structure layer are not especially restricted, but in the case of a plain membrane type fluorine resin polymer separation membrane, a double slit type nozzle having arranged two slits is preferably used. In the case of a hollow fiber type fluorine resin polymer separation membrane, a triple tube type nozzle plate is preferably used. A fluorine resin polymer solution for forming a three-dimensional network structure layer is discharged from the outer tube of a triple tube type nozzle plate, a fluorine resin polymer solution for forming a spherical structure layer is discharged from the middle tube, and a fluid for forming a hollow part is discharged from the inner tube, respectively, and the discharged solutions are cooling solidified and coagulated in a solidifying bath to form hollow fiber. When a hollow membrane is manufactured according to such a method, it is advantageous that the fluid for forming a hollow part can be decreased as compared with the amount of the solution subjecting to cooling solidification in the manufacture of the plain membrane, so that especially preferred. In addition, when a fluorine resin polymer solution for forming a three-dimensional network structure layer is discharged from the outer tube and a fluorine resin polymer solution for forming a spherical structure layer is discharged from the middle tube, a hollow membrane having the three-dimensional network structure layer outside and the spherical structure layer inside can be obtained. Contrary to this, when a fluorine resin polymer solution for forming a three-dimensional network structure layer is discharged from the middle tube and a fluorine resin polymer solution for forming a spherical structure layer is discharged from the outer tube, a hollow membrane having the three-dimensional network structure layer inside and the spherical structure layer outside can be obtained.

The fluorine resin polymer separation membrane is encased in a casing equipped with the inlet for raw water and the outlet for permeated liquid and used for membrane filtration processing as a membrane module. When the separation membrane is a hollow fiber membrane, for example, a module structure of a type in which a bundle of a plurality of hollow fiber membranes are encased in a cylindrical container, and the hollow fiber membranes are fixed at both ends or either one end with a polyurethane or epoxy resin for recovering the liquid permeated through the hollow fiber membranes, and a type in which hollow fiber membranes are fixed at both ends in a flat plate form for recovering the liquid permeated through the hollow fiber membranes are exemplified.

When the fluorine resin polymer separation membrane is a plain membrane, a module structure of a type in which the plain membrane is folded envelope-wise and wound spirally around a liquid collecting tube and encased in a cylindrical container for recovering the liquid permeated through the membrane, and a module structure of a type in which plain membranes are arranged on both sides of a liquid collecting plate and the periphery of the membranes is closely fixed to the plate frame for recovering the liquid permeated through the membranes are exemplified.

These membrane modules are used as a separation apparatus for water preparation by providing at least a pressurizing means on the war water side or a suction means on the permeated liquid side so that a fluid (in particular, water) can permeate through the membrane. As the pressurizing means, a pump may be used, or pressure by water level difference may be used. As the suction means, a pump or a siphon may be used.

A membrane separation apparatus using a separation membrane for filtration can be used in the field of water treatment, e.g., a water purifying treatment, city water treatment, waste water treatment, or industrial water preparation, and the water to be treated (raw water) includes river water, lake and marsh water, underground water, seawater, sewage water and waste water.

Further, when the fluorine polymer separation membranes of the invention are used as a blood cleaning membrane, the separation membranes are promising in view of the improvement in elimination of waste matters in the blood, and the improvement in durability of the blood cleaning membrane for their high breaking strength.

EXAMPLE

The invention will be described more specifically with reference to examples, but the invention is by no means restricted thereto.

The numerical values representing the structure of a membrane and membrane performance in separation membranes described below were measured according to the following methods.

[The Average Diameter of Approximately Spherical Solid Parts in the Spherical Structure Layer of a Fluorine Resin Polymer Separation Membrane]

The average diameter is found by taking photographs of the cross-section of a fluorine resin polymer separation membrane with a scanning electron microscope (S-800, manufactured by Hitachi Limited) by 10,000 magnifications, measuring the diameters of arbitrary thirty approximately spherical solid parts, and averaging in number.

[The Average Pore Diameter on the Surface of a Three-dimensional Network Structure Layer of a Fluorine Resin Polymer Separation Membrane]

The average pore diameter is found by taking photographs of the surface of a fluorine resin polymer separation membrane with the scanning electron microscope by 60,000 magnifications, measuring the pore diameters of arbitrarily selected thirty photographs, and averaging the measured diameters in number.

[The Average Thickness of a Three-dimensional Network Structure Layer and the Average Thickness of a Spherical Structure Layer of a Fluorine Resin Polymer Separation Membrane]

The cross-section of a fluorine resin polymer separation membrane is photographed with the scanning electron microscope by 100 magnifications and 1,000 magnifications respectively, and the thickness of each layer is computed according to the following methods.

In the case of a separation membrane having the layer structure having arranged a three-dimensional network structure layer outside and a spherical structure layer inside, the average thickness of the three-dimensional network structure layer is found according to the following method.

On the photomicrograph of 1,000 magnifications, a distance from an arbitrary point on the surface of the outer layer to a point where a spherical structure is observed first along a direction toward the inner layer and perpendicular to a tangential line to the surface of the outer layer is measured. The distance is the thickness of the three-dimensional network structure layer. The same procedure is repeated at arbitrary thirty points, and the obtained values are averaged in number to compute the average thickness of the three-dimensional network structure layer.

The average thickness of a spherical structure layer can also be computed in the similar manner. However, in following examples, the spherical structure layer of the separation membrane is thick and the fluorine resin polymer separation membrane from the surface of the outer layer to the surface of the inner layer on the opposite side cannot be included in a single photomicrograph of 1,000 magnifications, so that the measurement has to be done by sticking a plurality of photographs. In the following examples, microphotographs taken by 100 magnifications are used as the thickness of the fluorine resin polymer separation membrane at large, and the distance from the surface of the outer layer to the surface of the inner layer on the opposite side on the cross section of the fluorine resin polymer separation membrane is measured. The same procedure is repeated at arbitrary thirty points, and the obtained values are averaged in number to find the average thickness of the fluorine resin polymer separation membrane at large. The thickness of the spherical structure layer is obtained by subtracting the average thickness of the three-dimensional network structure layer from the average thickness of the fluorine resin polymer separation membrane at large.

[Confirmation of the Presence of Micro-voids having a Void Diameter of 5 μm or more in a Three-dimensional Network Structure Layer]

The cross-section of a three-dimensional network structure layer is photographed with the scanning electron microscope by 3,000 magnifications at different thirty points. The presence of a micro-void, and the void diameter (long axis length) of the micro-void are measured from these photographs. When there is not present a micro-void, or a micro-void having a long axis length of less than 5 μm alone is present, it is judged that a micro-void having a void diameter of 5 μm or more is absent. When a micro-void having a long axis length of 5 μm or more is present, it is judged that a micro-void having a void diameter of 5 μm or more is present.

[Pure Water Permeating Performance of a Separation Membrane]

When a fluorine resin polymer separation membrane is a hollow fiber membrane, a miniature membrane module is prepared with four hollow fiber membranes of a length of 200 mm. Using pure water obtained by reverse osmosis membrane as the raw water, dead-end membrane filtration under external pressure is performed for 10 minutes, under the conditions of temperature of 25° C. and differential pressure of filtration of 16 kPa to thereby find a permeated water amount ($m^3$). The permeated water amount ($m^3$) is converted to a value per a unit time (hr) and an effective area of membrane ($m^2$), and multiplied by (50/16) times to obtain the value of a permeated water amount ($m^3/m^2 \cdot hr$) under pressure of 50 kPa, as the value of pure water permeability.

[The Eliminating Rate of Dextran having Molecular Weight of 75,000 in a Separation Membrane]

The elimination rate of dextran having molecular weight of 75,000 is performed with the miniature membrane module described above under the conditions of temperature of 25° C., differential pressure of filtration of 16 kPa, and membrane linear velocity of 1 m/s, with an aqueous solution containing 1,000 ppm of dextran having molecular weight of 75,000 (Dextran 70, manufactured by Pharmacia Bioprocess Technology) as the raw water for 10 minutes by an external pressure cross flow system. In the next place, the dextran concentration in the raw water and the filtered water are respectively measured with a differential refractive index meter (RID-6A, 100 V, manufactured by Shimadzu Corporation), and the elimination rate of dextran having molecular weight of 75,000 is computed according the following expression.

Elimination rate of dextran having molecular weight of 75,000 (%)=[1−(dextran concentration in filtered water)/(dextran concentration in raw water)]×100

[The Tenacity and Fracture Elongation of a Separation Membrane]

The tenacity and elongation at the time of breaking of a sample of a measurement length of 50 mm are found with a tensile tester (TENSILON®-100, manufactured by Toyo-Baldwin Co.) at a tensile rate of 50 mm/min. This operation is performed 10 times with a different sample, and the obtained values are number averaged to obtain the average values of the tenacity and fracture elongation. In the case of a plain membrane, the width of a sample is 5 mm.

[Air Scrubbing Durability Evaluation of a Separation Membrane]

An air scrubbing durability test as described below was performed in order to evaluate the physical durability of the separation membrane. A membrane module is manufactured by filling a bundle of 1,500 hollow fiber membranes in a cylindrical transparent container having a diameter of 10 cm and a length of 100 cm. The membrane module is then filled with drinking water, and the membrane surface is subjected to air scrubbing by continuously supplying air from a lower part of the container at a rate of 100 l/min. The air scrubbing is carried out continuously for 122 days, and then the fibers are inspected for breakage in 122 days. The period of 122 days is equivalent to air scrubbing for 10 years in the case of adopting the operation method of performing air scrubbing for 1 minute in the frequency of every 30 minutes.

Example 1

Vinylidene fluoride homopolymer having weight average molecular weight of 417,000 and γ-butyrolactone in the proportion of 38 wt % and 62 wt % respectively were dissolved at 170° C. The polymer solution was discharged from a nozzle being accompanied by γ-butyrolactone as a hollow part-forming liquid, and solidified in a cooling bath comprising an 80 wt % aqueous solution of γ-butyrolactone at 20° C., whereby a hollow fiber membrane having a spherical structure was manufactured.

In the next place, in the proportion of 14 wt % of vinylidene fluoride homopolymer having weight average molecular weight of 284,000, 3 wt % of cellulose acetate (cellulose triacetate, CA435-75S, manufactured by Eastman Chemical Company), 77 wt % of N-methyl-2-pyrrolidone, 3 wt % of polyoxyethylene coconut oil fatty acid sorbitan (Ionet T-20C, trade name, manufactured by Sanyo Chemical Industries Ltd., hereinafter abbreviated to T-20C), and 3 wt % of water were mixed and dissolved at 95° C. to prepare a polymer solution. The prepared film-forming stock solution was uniformly coated on the surface of the hollow fiber membrane having a spherical structure, and the coated solution was immediately coagulated in a 30 wt % N-methyl-2-pyrrolidone aqueous solution to form a hollow fiber membrane comprising a spherical structure layer having formed thereon a three-dimensional network structure layer.

The obtained hollow fiber membrane had an outside diameter of 1,340 μm, an inside diameter of 780 μm, the average diameter of the spherical structure of 2.8 μm, the average surface pore size of the three-dimensional network structure layer of 14 nm, the average thickness of the three-dimensional network structure layer of 38 μm, the average thickness of the spherical structure layer of 243 μm, pure water permeability of 0.15 $m^3/m^2 \cdot hr$, the eliminating rate of dextran having molecular weight of 75,000 of 86%, tenacity of 8.0N, and fracture elongation of 85%. A micro-void having a void diameter of 5 μm or more was not present in the three-dimensional network structure layer.

The electron microphotograph (1,000 magnifications) of the cross-section of the hollow fiber membrane manufactured is shown in FIG. 1. The electron microphotograph (60,000 magnifications) of the surface of the hollow fiber membrane (the surface of the three-dimensional network structure layer) is shown in FIG. 2.

As a result of the evaluation of air scrubbing durability, fiber breakage was not observed at all even after 122 days.

The obtained hollow fiber membrane is excellent in physical durability, high in the eliminating rate of dextran, excellent in virus eliminating performance, and is highly practicable and usable for a long period of time as the filtration membrane for the elimination of virus. The results of evaluations are summarized in Table 1 below.

Example 2

First, a hollow fiber membrane having a spherical structure was prepared in the same manner as in Example 1.

In the next place, 13 wt % of vinylidene fluoride homopolymer having weight average molecular weight of 284,000, 4 wt % of cellulose acetate (CA435-75S, manufactured by Eastman Chemical Company), 77 wt % of N-methyl-2-pyrrolidone, 3 wt % of T-20C, and 3 wt % of water were mixed and dissolved at 95° C. to prepare a polymer solution. The prepared film-forming stock solution was uniformly coated on the surface of the hollow fiber membrane having a spherical structure, and the coated solution was immediately coagulated in a 30 wt % N-methyl-2-pyrrolidone aqueous solution to form a hollow fiber membrane comprising a spherical structure layer having formed thereon a three-dimensional network structure layer.

The obtained hollow fiber membrane had an outside diameter of 1,340 μm, an inside diameter of 780 μm, the average diameter of the spherical structure of 2.7 μm, the average surface pore size of the three-dimensional network structure layer of 10 nm, the average thickness of the three-dimensional network structure layer of 35 μm, the average thickness of the spherical structure layer of 244 μm, pure water permeability of 0.11 $m^3/m^2 \cdot hr$, the eliminating rate of dextran having molecular weight of 75,000 of 90%, tenacity of 8.1N, and fracture elongation of 86%. A micro-void having a void diameter of 5 μm or more was not present in the three-dimensional network structure.

As a result of the evaluation of air scrubbing durability, fiber breakage was not observed at all even after 122 days.

The obtained hollow fiber membrane is excellent in physical durability, high in the eliminating rate of dextran, excellent in virus eliminating performance, and is a highly practicable filtration membrane for the elimination of virus. The results of evaluations are summarized in Table 1 below.

Example 3

First, a hollow fiber membrane having a spherical structure was prepared in the same manner as in Example 1.

In the next place, 12 wt % of vinylidene fluoride homopolymer having weight average molecular weight of 284,000, 3 wt % of cellulose acetate (CA435-75S, manufactured by Eastman Chemical Company), 79 wt % of N-methyl-2-pyrrolidone, 3 wt % of T-20C, and 3 wt % of water were mixed and dissolved at 95° C. to prepare a polymer solution. The prepared film-forming stock solution was uniformly coated on the surface of the hollow fiber membrane having a spherical structure, and the coated solution was immediately coagulated in a 30 wt % N-methyl-2-pyrrolidone aqueous solution to form a hollow fiber membrane comprising a spherical structure layer having formed thereon a three-dimensional network structure layer.

The obtained hollow fiber membrane had an outside diameter of 1,340 μm, an inside diameter of 780 μm, the average diameter of the spherical structure of 2.8 μm, the average surface pore size of the three-dimensional network structure layer of 20 nm, the average thickness of the three-dimensional network structure layer of 36 μm, the average thickness of the spherical structure layer of 244 μm, pure water permeability of 0.25 $m^3/m^2 \cdot hr$, the eliminating rate of dextran having molecular weight of 75,000 of 80%, tenacity of 7.9N, and fracture elongation of 87%. A micro-void having a void diameter of 5 μm or more was not present in the three-dimensional network structure.

As a result of the evaluation of air scrubbing durability, fiber breakage was not observed at all even after 122 days. The obtained hollow fiber membrane is excellent in physical durability, high in the eliminating rate of dextran, excellent in virus eliminating performance, and is a highly practicable filtration membrane for the elimination of virus. The results of evaluations are summarized in Table 1 below.

Example 4

First, a hollow fiber membrane having a spherical structure was prepared in the same manner as in Example 1.

In the next place, 12 wt % of vinylidene fluoride homopolymer having weight average molecular weight of 284,000, 7.2 wt % of cellulose acetate (CA435-75S, manufactured by Eastman Chemical Company), and 80.8 wt % of N-methyl-2-pyrrolidone were mixed and dissolved at 95° C. to prepare a polymer solution. The prepared film-forming stock solution was uniformly coated on the surface of the hollow fiber membrane having a spherical structure, and the coated solution was immediately coagulated in a solidifying bath comprising 100% of water to form a hollow fiber membrane comprising a spherical structure layer having formed thereon a three-dimensional network structure layer.

The obtained hollow fiber membrane had an outside diameter of 1,340 μm, an inside diameter of 780 μm, the average diameter of the spherical structure of 2.8 μm, the average surface pore size of the three-dimensional network structure layer of 20 nm, the average thickness of the three-dimensional network structure layer of 35 μm, the average thickness of the spherical structure layer of 244 μm, pure water permeability of 0.30 m$^3$/m$^2$·hr, the eliminating rate of dextran having molecular weight of 75,000 of 90%, tenacity of 7.0N, and fracture elongation of 55%. A micro-void having a void diameter of 5 μm or more was not present in the three-dimensional network structure.

As a result of the evaluation of air scrubbing durability, fiber breakage was not observed at all even after 122 days. The obtained hollow fiber membrane is excellent in physical durability, high in the eliminating rate of dextran, excellent in virus eliminating performance, and is a highly practicable filtration membrane for the elimination of virus. The results of evaluations are summarized in Table 1 below.

Comparative Example 1

First, a hollow fiber membrane having a spherical structure was prepared in the same manner as in Example 1.

In the next place, 16 wt % of vinylidene fluoride homopolymer having weight average molecular weight of 284,000, 78 wt % of N-methyl-2-pyrrolidone, 3 wt % of T-20C, and 3 wt % of water were mixed and dissolved at 95° C. to prepare a polymer solution. The prepared film-forming stock solution was uniformly coated on the surface of the hollow fiber membrane having a spherical structure, and the coated solution was immediately coagulated in a 30 wt % N-methyl-2-pyrrolidone aqueous solution to form a hollow fiber membrane comprising a spherical structure layer having formed thereon a three-dimensional network structure layer.

The obtained hollow fiber membrane had an outside diameter of 1,340 μm, an inside diameter of 780 μm, the average diameter of the spherical structure of 2.8 μm, the average surface pore size of the three-dimensional network structure layer of 56 nm, the average thickness of the three-dimensional network structure layer of 34 μm, the average thickness of the spherical structure layer of 244 μm, pure water permeability of 1.05 m$^3$/m$^2$·hr, the eliminating rate of dextran having molecular weight of 75,000 of 32%, tenacity of 8.0N, and fracture elongation of 84%. A micro-void having a void diameter of 5 μm or more was not present in the three-dimensional network structure. Since the obtained hollow fiber membrane did not contain cellulose ester, the average surface pore size of the three-dimensional network structure layer was large.

As a result of the evaluation of air scrubbing durability, fiber breakage was not observed at all even after 122 days. The obtained hollow fiber membrane is excellent in physical durability, but low in the eliminating rate of dextran and inferior in virus eliminating performance, so that it is not suitable as the filtration membrane for the elimination of virus. The results of evaluations are summarized in Table 2 below.

Comparative Example 2

First, a hollow fiber membrane having a spherical structure was prepared in the same manner as in Example 1.

In the next place, 15 wt % of vinylidene fluoride homopolymer having weight average molecular weight of 284,000, 1 wt % of cellulose acetate (CA435-75S, manufactured by Eastman Chemical Company), 78 wt % of N-methyl-2-pyrrolidone, 3 wt % of T-20C, and 3 wt % of water were mixed and dissolved at 95° C. to prepare a polymer solution. The prepared film-forming stock solution was uniformly coated on the surface of the hollow fiber membrane having a spherical structure, and the coated solution was immediately coagulated in a 30 wt % N-methyl-2-pyrrolidone aqueous solution to form a hollow fiber membrane comprising a spherical structure layer having formed thereon a three-dimensional network structure layer.

The obtained hollow fiber membrane had an outside diameter of 1,340 μm, an inside diameter of 780 μm, the average diameter of the spherical structure of 2.7 μm, the average surface pore size of the three-dimensional network structure layer of 41 nm, the average thickness of the three-dimensional network structure layer of 35 μm, the average thickness of the spherical structure layer of 246 μm, pure water permeability of 0.40 m$^3$/m$^2$·hr, the eliminating rate of dextran having molecular weight of 75,000 of 60%, tenacity of 8.1N, and fracture elongation of 85%. A micro-void having a void diameter of 5 μm or more was not present in the three-dimensional network structure. Since the mixing ratio of the cellulose ester to the fluorine resin polymer was low, the average surface pore size of the three-dimensional network structure layer of the obtained hollow fiber membrane was large.

As a result of the evaluation of air scrubbing durability, fiber breakage was not observed at all even after 122 days. The obtained hollow fiber membrane is excellent in physical durability, but low in the eliminating rate of dextran and inferior in virus eliminating performance, so that it is not suitable as the filtration membrane for the elimination of virus. The results of evaluations are summarized in Table 2 below.

Comparative Example 3

First, a hollow fiber membrane having a spherical structure was prepared in the same manner as in Example 1.

In the next place, a polymer solution was prepared with the same composition as in Example 1. A hollow fiber membrane comprising a spherical structure layer having thereon a three-dimensional network structure layer was formed in the same manner as in Example 1, except that a 30 wt % N-methyl-2-pyrrolidone aqueous solution of the solidifying bath was replaced with water.

The obtained hollow fiber membrane had an outside diameter of 1,340 μm, an inside diameter of 780 μm, the average diameter of the spherical structure of 2.8 μm, the average surface pore size of the three-dimensional network structure layer of 16 nm, the average thickness of the three-dimensional network structure layer of 38 μm, the average thickness of the spherical structure layer of 243 μm, pure water permeability of 0.30 m$^3$/m$^2$·hr, the eliminating rate of dextran having molecular weight of 75,000 of 54%, tenacity of 8.0N, and fracture elongation of 85%. Since water was used as the solidifying bath, it was confirmed that micro-voids having a void diameter of 5 μm or more were present on every cross-section of the obtained hollow fiber membrane, and the proportion of the presence of micro-voids having a void diameter of 5 μm or more was 100%.

Figure 3:
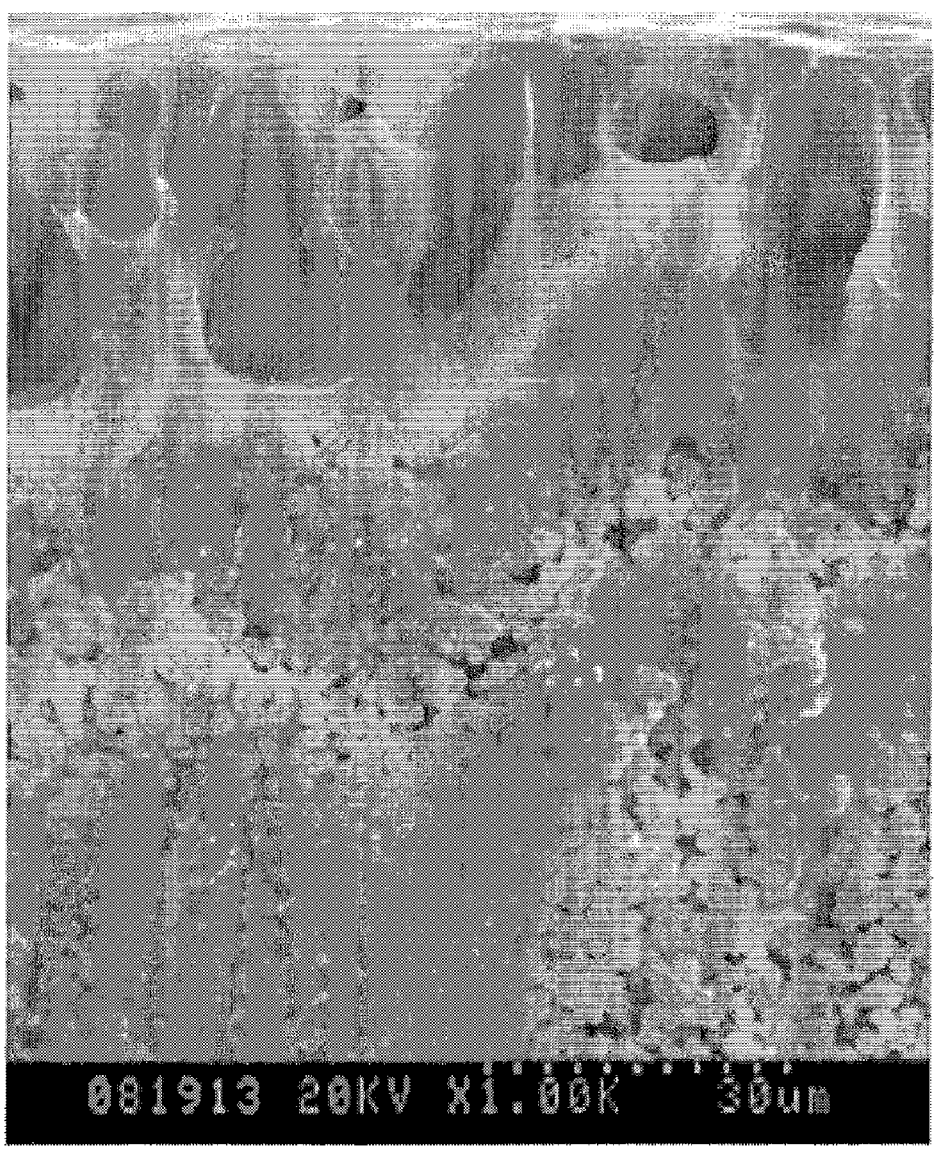
FIG. 3 is an electron microphotograph showing the cross-section of the hollow fiber membrane manufactured in Comparative Example 3.
Figure 4:
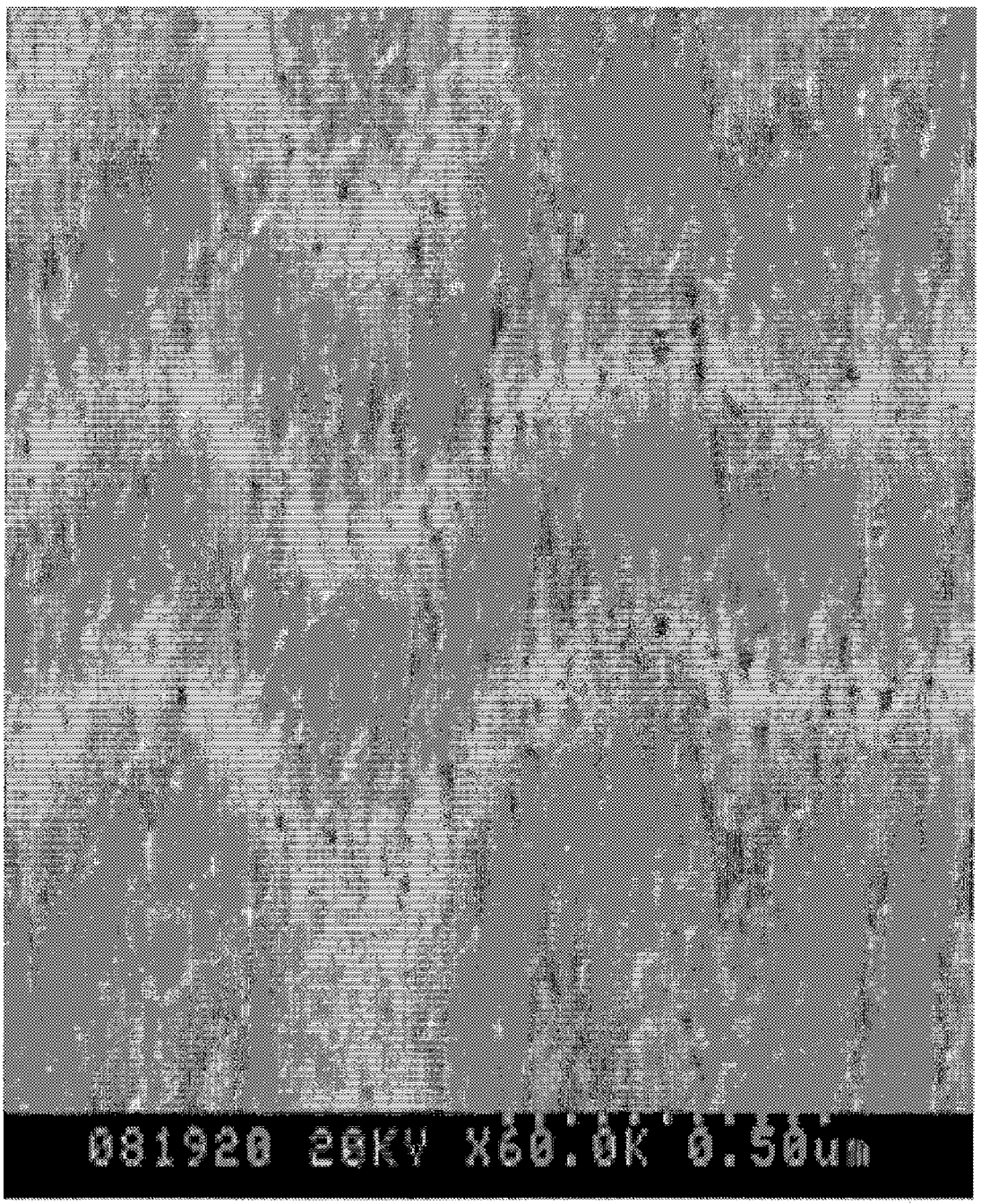
FIG. 4 is an electron microphotograph showing the outer surface of the hollow fiber membrane manufactured in Comparative Example 3.

The electron microphotograph (1,000 magnifications) of the cross-section of the hollow fiber membrane manufactured is shown in FIG. 3. The electron microphotograph (60,000 magnifications) of the surface of the hollow fiber membrane (the surface of the three-dimensional network structure layer) is shown in FIG. 4.

As a result of the evaluation of air scrubbing durability, fiber breakage was not observed at all even after 122 days. The obtained hollow fiber membrane is excellent in physical durability, but low in the eliminating rate of dextran and inferior in virus eliminating performance, so that it is not suitable as the filtration membrane for the elimination of virus. The results of evaluations are summarized in Table 2 below.

Comparative Example 4

First, a hollow fiber membrane having a spherical structure was prepared in the same manner as in Example 1.

In the next place, 11 wt % of vinylidene fluoride homopolymer having weight average molecular weight of 284,000, 2 wt % of cellulose acetate (CA435-75S, manufactured by Eastman Chemical Company), 81 wt % of N-methyl-2-pyrrolidone, 3 wt % of T-20C, and 3 wt % of water were mixed and dissolved at 95° C. to prepare a polymer solution. The prepared film-forming stock solution was uniformly coated on the surface of the hollow fiber membrane having a spherical structure, and the coated solution was immediately coagulated in a 30 wt % N-methyl-2-pyrrolidone aqueous solution to form a hollow fiber membrane comprising a spherical structure layer having formed thereon a three-dimensional network structure layer.

The obtained hollow fiber membrane had an outside diameter of 1,340 μm, an inside diameter of 780 μm, the average diameter of the spherical structure of 2.8 μm, the average surface pore size of the three-dimensional network structure layer of 34 nm, the average thickness of the three-dimensional network structure layer of 35 μm, the average thickness of the spherical structure layer of 245 μm, pure water permeability of 0.34 m$^3$/m$^2$·hr, the eliminating rate of dextran having molecular weight of 75,000 of 52%, tenacity of 8.0N, and fracture elongation of 86%. A micro-void having a void diameter of 5 μm or more was not present in the three-dimensional network structure. Since the concentration of polymer was low, the average surface pore size of the three-dimensional network structure layer of the obtained hollow fiber membrane was large.

As a result of the evaluation of air scrubbing durability, fiber breakage was not observed at all even after 122 days. The obtained hollow fiber membrane is excellent in physical durability, but low in the eliminating rate of dextran and inferior in virus eliminating performance, so that it is not suitable as the filtration membrane for the elimination of virus. The results of evaluations are summarized in Table 2 below.

Comparative Example 5

Vinylidene fluoride homopolymer having weight average molecular weight of 284,000 (14 wt %), 2 wt % of cellulose acetate (CA435-75S, manufactured by Eastman Chemical Company), 78 wt % of N-methyl-2-pyrrolidone, 3 wt % of T-20C, and 3 wt % of water were mixed and dissolved at 95° C. to prepare a polymer solution. The polymer solution was discharged from a nozzle being accompanied by a 30 wt % N-methyl-2-pyrrolidone aqueous solution as a hollow part-forming liquid and a solidifying liquid, and solidified in a 30 wt % N-methyl-2-pyrrolidone aqueous solution at 40° C., whereby a hollow fiber membrane comprising a three-dimensional network structure alone was manufactured.

The obtained hollow fiber membrane had an outside diameter of 1,340 μm, an inside diameter of 780 μm, the average surface pore size of the three-dimensional network structure layer of 19 nm, the average thickness of the three-dimensional network structure layer of 280 μm, pure water permeability of 0.21 m$^3$/m$^2$·hr, the eliminating rate of dextran having molecular weight of 75,000 of 80%, tenacity of 2.0N, and fracture elongation of 28%. A micro-void having a void diameter of 5 μm or more was not present in the three-dimensional network structure. Since the obtained hollow fiber membrane does not have a spherical structure layer, tenacity and fracture elongation were low.

As a result of the evaluation of air scrubbing durability, fiber breakage was observed after 11 days, and several ten fibers broke after 20 days. The obtained hollow fiber membrane is high in the eliminating rate of dextran, but inferior in physical durability, so that so that it is not practicable as the filtration membrane for the elimination of virus. The results of evaluations are summarized in Table 3 below.

Comparative Example 6

A hollow fiber membrane having a spherical structure was prepared in the same manner as in Example 1. A three-dimensional network structure layer was not formed on the spherical structure layer of the hollow fiber membrane, and the sample was evaluated as hollow fiber membrane as it was.

The obtained hollow fiber membrane had an outside diameter of 1,340 μm, an inside diameter of 780 μm, the average diameter of the spherical structure of 2.7 μm, the average thickness of the spherical structure layer of 280 μm, pure water permeability of 2.02 m$^3$/m$^2$·hr, the eliminating rate of dextran having molecular weight of 75,000 of 10%, tenacity of 8.1N, and fracture elongation of 84%.

As a result of the evaluation of air scrubbing durability, fiber breakage was not observed at all even after 122 day. The obtained hollow fiber membrane is excellent in physical durability, but low in the eliminating rate of dextran and inferior in virus eliminating performance, so that it is not suitable as the filtration membrane for the elimination of virus. The results of evaluations are summarized in Table 3 below.

Comparative Example 7

First, a hollow fiber membrane having a spherical structure was prepared in the same manner as in Example 1.

In the next place, a polymer solution was prepared with the same composition as in Example 1. A hollow fiber membrane comprising a spherical structure layer having thereon a three-dimensional network structure layer was formed in the same manner as in Example 1, except that the average thickness of the three-dimensional network structure layer was changed from 38 μm to 125 μm.

The obtained hollow fiber membrane had an outside diameter of 1,514 μm, an inside diameter of 780 μm, the average diameter of the spherical structure of 2.8 μm, the average surface pore size of the three-dimensional network structure layer of 16 nm, the average thickness of the three-dimensional network structure layer of 125 μm, the average thickness of the spherical structure layer of 242 μm, pure water permeability of 0.10 m$^3$/m$^2$·hr, the eliminating rate of dextran having molecular weight of 75,000 of 70%, tenacity of 8.2N, and fracture elongation of 75%. Micro-voids having a void diameter of 5 μm or more were present in the three-dimensional network structure. Since the three-dimensional network structure layer is as thick as 125 μm, the obtained hollow fiber membrane has micro-voids having a void diameter of 5 μm or more.

As a result of the evaluation of air scrubbing durability, fiber breakage was not observed at all even after 122 days.

The obtained hollow fiber membrane is excellent in physical durability, but low in the eliminating rate of dextran due to the presence of micro-voids and not suitable for the elimination of virus. The results of evaluations are summarized in Table 3 below.

Comparative Example 8

Membrane filtration was performed with a hollow fiber membrane made of polyacrylonitrile (trade name: Torayfil (registered trademark), article No.: CP10-1010, manufactured by Toray Industries Inc.). The hollow fiber membrane comprises polyacrylonitrile having a three-dimensional network structure layer alone.

The hollow fiber membrane had an outside diameter of 480 μm, an inside diameter of 350 μm, the average surface pore size of the three-dimensional network structure layer of 10 nm, the average thickness of the three-dimensional network structure layer of 65 μm, pure water permeability of 0.18 m$^3$/m$^2$·hr, the eliminating rate of dextran having molecular weight of 75,000 of 80%, tenacity of 0.7N, and fracture elongation of 85%. A micro-void having a void diameter of 5 μm or more was not present in the three-dimensional network structure. Since the hollow fiber membrane is formed of polyacrylonitrile and does not have a spherical structure layer, tenacity is low.

As a result of the evaluation of air scrubbing durability, fiber breakage was observed after 50 days, and several ten fibers broke after 80 days. The hollow fiber membrane is high in the eliminating rate of dextran, but inferior in physical durability, so that so that it is not practicable as the filtration membrane for the elimination of virus. The results of evaluations are summarized in Table 3 below.

TABLE 1

| | | Example 1 | Example 2 | Example 3 | Example 4 |
|---|---|---|---|---|---|
| Spherical structure layer | Kind of constituent polymer | Vinylidene fluoride polymer | Vinylidene fluoride polymer | Vinylidene fluoride polymer | Vinylidene fluoride polymer |
| | Average diameter of approximately spherical part (μm) | 2.8 | 2.7 | 2.8 | 2.8 |
| | Average layer thickness (μm) | 243 | 244 | 244 | 244 |
| Three-dimensional network structure layer | Constituent polymer composition — Kind of fluorine resin polymer | Vinylidene fluoride polymer | Vinylidene fluoride polymer | Vinylidene fluoride polymer | Vinylidene fluoride polymer |
| | Kind of cellulose ester | Cellulose acetate | Cellulose acetate | Cellulose acetate | Cellulose acetate |
| | The ratio of the content of cellulose ester to the content of fluorine resin polymer (wt %) | 21.4 | 30.8 | 25.0 | 60.0 |
| | Average pore size on the surface (μm) | 14 | 10 | 20 | 20 |
| | Presence of micro-voids of 5 μm or more | Absent | Absent | Absent | Absent |
| | Average layer thickness (μm) | 38 | 35 | 36 | 35 |
| | Manufacture condition — Polymer concentration in coating solution (wt %) | 17.0 | 17.0 | 15.0 | 19.2 |
| | Composition of solidifying bath | 30% aq. soln. of N-methyl-2-pyrrolidone | 30% aq. soln. of N-methyl-2-pyrrolidone | 30% aq. soln. of N-methyl-2-pyrrolidone | Water |
| Performance of separation membrane | Pure water permeability (m$^3$/m$^2$ · hr) | 0.15 | 0.11 | 0.25 | 0.30 |
| | Elimination ratio of dextran having mol. wt. of 75,000 (%) | 86 | 90 | 80 | 90 |
| | Tenacity (N) | 8.0 | 8.1 | 7.9 | 7.0 |
| | Fracture elongation (%) | 85 | 86 | 87 | 55 |
| | Air scrubbing durability evaluation (fiber breakage in 122 days) | No | No | No | No |

TABLE 2

| | | Comp. Ex. 1 | Comp. Ex. 2 | Comp. Ex. 3 | Comp. Ex. 4 |
|---|---|---|---|---|---|
| Spherical structure layer | Kind of constituent polymer | Vinylidene fluoride polymer | Vinylidene fluoride polymer | Vinylidene fluoride polymer | Vinylidene fluoride polymer |
| | Average diameter of approximately spherical part (μm) | 2.8 | 2.7 | 2.8 | 2.8 |
| | Average layer thickness (μm) | 244 | 246 | 243 | 245 |
| Three-dimensional network structure layer | Constituent polymer composition — Kind of fluorine resin polymer | Vinylidene fluoride polymer | Vinylidene fluoride polymer | Vinylidene fluoride polymer | Vinylidene fluoride polymer |
| | Kind of cellulose ester | — | Cellulose acetate | Cellulose acetate | Cellulose acetate |
| | The ratio of the content of cellulose ester to the content of fluorine resin polymer (wt %) | 0.0 | 6.7 | 21.4 | 18.2 |
| | Average pore size on the surface (μm) | 56 | 41 | 16 | 34 |
| | Presence of micro-voids of 5 μm or more | Absent | Absent | Present | Absent |
| | Average layer thickness (μm) | 34 | 35 | 38 | 35 |
| | Manufacture condition — Polymer concentration in coating solution (wt %) | 16.0 | 16.0 | 17.0 | 13.0 |
| | Composition of solidifying bath | 30% aq. soln. of N-methyl-2-pyrrolidone | 30% aq. soln. of N-methyl-2-pyrrolidone | Water | 30% aq. soln. of N-methyl-2-pyrrolidone |

TABLE 2-continued

|  |  | Comp. Ex. 1 | Comp. Ex. 2 | Comp. Ex. 3 | Comp. Ex. 4 |
|---|---|---|---|---|---|
| Performance of separation membrane | Pure water permeability (m³/m² · hr) | 1.05 | 0.40 | 0.30 | 0.34 |
|  | Elimination ratio of dextran having mol. wt. of 75,000 (%) | 32 | 60 | 54 | 52 |
|  | Tenacity (N) | 8.0 | 8.1 | 8.0 | 8.0 |
|  | Fracture elongation (%) | 84 | 85 | 85 | 86 |
|  | Air scrubbing durability evaluation (fiber breakage in 122 days) | No | No | No | No |

TABLE 3

|  |  |  | Comp. Ex. 5 | Comp. Ex. 6 | Comp. Ex. 7 | Comp. Ex. 8 |
|---|---|---|---|---|---|---|
| Spherical structure layer | Kind of constituent polymer |  | — | Vinylidene fluoride polymer | Vinylidene fluoride polymer | — |
|  | Average diameter of approximately spherical part (μm) |  | — | 2.7 | 2.8 | — |
|  | Average layer thickness (μm) |  | — | 280 | 242 | — |
| Three-dimensional network structure layer | Constituent polymer composition | Kind of fluorine resin polymer | Vinylidene fluoride polymer | — | Vinylidene fluoride polymer | Polyacrylo-nitrile |
|  |  | Kind of cellulose ester | Cellulose acetate | — | Cellulose acetate | — |
|  |  | The ratio of the content of cellulose ester to the content of fluorine resin polymer (wt %) | 14.3 | — | 21.4 | — |
|  | Average pore size on the surface (μm) |  | 19 | — | 16 | 10 |
|  | Presence of micro-voids of 5 μm or more |  | Absent | — | Present | Absent |
|  | Average layer thickness (μm) |  | 280 | — | 125 | 65 |
|  | Manufacture condition | Polymer concentration in coating solution (wt %) | 16.0 | — | 17.0 | — |
|  |  | Composition of solidifying bath | 30% aq. soln. of N-methyl-2-pyrrolidone | — | 30% aq. soln. of N-methyl-2-pyrrolidone | — |
| Performance of separation membrane | Pure water permeability (m³/m² · hr) |  | 0.21 | 2.02 | 0.10 | 0.18 |
|  | Elimination ratio of dextran having mol. wt. of 75,000 (%) |  | 80 | 10 | 70 | 80 |
|  | Tenacity (N) |  | 2.0 | 8.1 | 8.2 | 0.7 |
|  | Fracture elongation (%) |  | 28 | 84 | 75 | 85 |
|  | Air scrubbing durability evaluation (fiber breakage in 122 days) |  | Yes | No | No | Yes |

Embodiments of the fluorine resin polymer separation membrane in the invention can be used as a filtration membrane in water processing fields such as manufacture of drinking water, water purification treatment, or waste water treatment, and in fields of pharmaceutical manufacture, food industries, and blood cleaning membranes. In particular, the fluorine resin polymer separation membrane can be preferably used for the elimination of microorganisms such as a virus in a liquid.

The invention claimed is:

1. A fluorine resin polymer separation membrane comprising:
a layer having a three-dimensional network structure; and
a layer having a spherical structure,
wherein the layer having the three-dimensional network structure comprises a fluorine resin polymer composition containing cellulose ester, and a mixing ratio of the cellulose ester to the fluorine resin polymer is from greater than 50 to 75 based on the wt % of the cellulose ester and the wt % of the fluorine resin polymer.

2. The fluorine resin polymer separation membrane as claimed in claim 1, wherein the layer having the three-dimensional network structure does not contain micro-voids having a void diameter of 5 μm to 120 μm, and the fluorine resin polymer separation membrane has filtration performance represented by an elimination rate of 80% or more of dextran having molecular weight of 75,000.

3. The fluorine resin polymer separation membrane as claimed in claim 1, wherein the cellulose ester is cellulose acetate.

4. The fluorine resin polymer separation membrane as claimed in claim 1, which has the layer having the three-dimensional network structure as an outermost layer.

5. The fluorine resin polymer separation membrane as claimed in claim 1, wherein the thickness of the layer having the three-dimensional network structure is from 20 to 120 μm.

6. The fluorine resin polymer separation membrane as claimed in claim 1, wherein the layer having the spherical structure comprises approximately spherical solid components and the average size of the approximately spherical solid components is from 0.1 to 5 μm.

7. The fluorine resin polymer separation membrane as claimed in claim 1, wherein the layer having the spherical structure comprising a fluorine resin polymer does not contain cellulose ester.

8. The fluorine resin polymer separation membrane as claimed in claim 1, which is a hollow fiber separation membrane having: pure water permeability at 50 kPa and 25° C. of from 0.10 to 10 m³/m²·hr; tenacity of 5N or more; and fracture elongation of 50% or more.

9. A membrane module comprising the polymer separation membrane as claimed in claim 1 as a filtration membrane.

10. A manufacturing method of a fluorine resin polymer separation membrane comprising:
coating, on a surface of a layer having a spherical structure comprising a fluorine resin polymer, a polymer solution containing a fluorine resin polymer and cellulose ester in a mixing ratio of the cellulose ester to the fluorine resin polymer of from greater than 50 to 75 based on the wt % of the cellulose ester and the wt % of the fluorine resin polymer; and solidifying the coated solution in a solidifying bath to thereby form a layer having a three-dimensional network structure.

11. The manufacturing method of a fluorine resin polymer separation membrane as claimed in claim 10, wherein the layer having the spherical structure comprising a fluorine resin polymer does not contain cellulose ester.

12. A manufacturing method of a fluorine resin polymer separation membrane, comprising:

discharging a polymer solution containing cellulose ester and a fluorine resin polymer in a mixing ratio of the cellulose ester to the fluorine resin polymer of from greater than 50 to 75 based on the wt % of the cellulose ester and the wt % of the fluorine resin polymer, and a fluorine resin polymer solution not containing cellulose ester, simultaneously from die; and solidifying the discharged solutions in a solidifying bath to thereby form a laminated film comprising a three-dimensional network structure layer comprising the fluorine resin polymer containing cellulose ester, and a spherical structure layer comprising the fluorine resin polymer.

13. The manufacturing method of a fluorine resin polymer separation membrane as claimed in claim 10 or 12, wherein the polymer solution containing cellulose ester is a polymer solution in which the total polymer concentration in the solution is from 14 to 30 wt %, and the solidifying bath is a solidifying bath containing the good solvent of the fluorine resin polymer.

14. The manufacturing method of a fluorine resin polymer separation membrane as claimed in claim 10 or 12, wherein the polymer solution containing cellulose ester is a polymer solution in which the total polymer concentration in the solution is from 14 to 30 wt %.

15. The manufacturing method of a fluorine resin polymer separation membrane as claimed in claim 10 or 12, the three-dimensional network structure not containing micro-voids of a void diameter of 5 µm to 120 µm on the surface of the layer having the spherical structure.

16. A fluorine resin polymer separation membrane comprising:

a layer having a three-dimensional network structure having a thickness of 30 pm to 120 pm; and a layer having a spherical structure, wherein the layer having the three-dimensional network structure comprises a fluorine resin polymer composition containing cellulose ester, and a mixing ratio of the cellulose ester to the fluorine resin polymer is from greater than 50 to 75 based on the wt % of the cellulose ester and the wt % of the fluorine resin polymer.

* * * * *

UNITED STATES PATENT AND TRADEMARK OFFICE
CERTIFICATE OF CORRECTION

PATENT NO. : 8,205,754 B2
APPLICATION NO. : 12/374863
DATED : June 26, 2012
INVENTOR(S) : Masayuki Hanakawa and Shin-Ichi Minegishi Page 1 of 1

It is certified that error appears in the above-identified patent and that said Letters Patent is hereby corrected as shown below:

Col. 36, claim 16, line 4 - 30 pm to 120 pm - should read -- 30 µm to 120 µm --

Signed and Sealed this
Twelfth Day of February, 2013

Teresa Stanek Rea
*Acting Director of the United States Patent and Trademark Office*